(12) United States Patent
Takatsu et al.

(10) Patent No.: US 6,337,848 B1
(45) Date of Patent: Jan. 8, 2002

(54) PATH SWITCHING DEVICE FOR TRANSMISSION APPARATUS

(75) Inventors: Kazuo Takatsu; Atsuki Taniguchi, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/042,966

(22) Filed: Mar. 17, 1998

(30) Foreign Application Priority Data

Oct. 17, 1997 (JP) .............................................. 9-285906

(51) Int. Cl.[7] .............................................. H04L 12/26
(52) U.S. Cl. ...................................... 370/218; 370/244
(58) Field of Search ................................ 370/217, 221, 370/222, 223, 224, 241, 242, 244, 248, 250, 251, 360, 539, 541, 218; 340/825.06, 825.16

(56) References Cited

U.S. PATENT DOCUMENTS 5,574,719 A * 11/1996 Ishiwatari .................. 370/351
5,757,774 A * 5/1998 Oka .......................... 370/242

FOREIGN PATENT DOCUMENTS

| JP | 60260254 | 12/1985 |
| JP | 6181043 | 4/1986 |
| JP | 6177850 | 8/1994 |
| JP | 6-319186 | 11/1994 |

* cited by examiner

*Primary Examiner*—Kwang B. Yao
(74) *Attorney, Agent, or Firm*—Rosenman & Colin LLP

(57) ABSTRACT

Two alarm detecting units required as alarm detecting units for controlling a PSW in order to implement a PSR function, are deleted, and instead the result of an alarm detection output by a conventional alarm detecting unit (E-THRU) for a BLSR function is cross-connected in units of STS-1 frames by an alarm TSA apparatus (E-DROP). In the same way, the result of an alarm detection output by an alarm detecting unit (W-THRU) is cross-connected in units of STS-1 frames by an alarm TSA apparatus(W-DROP). These two cross-connected alarms are compared by a comparing unit (DROP). Based on the result of the comparison the PSW is controlled.

5 Claims, 23 Drawing Sheets

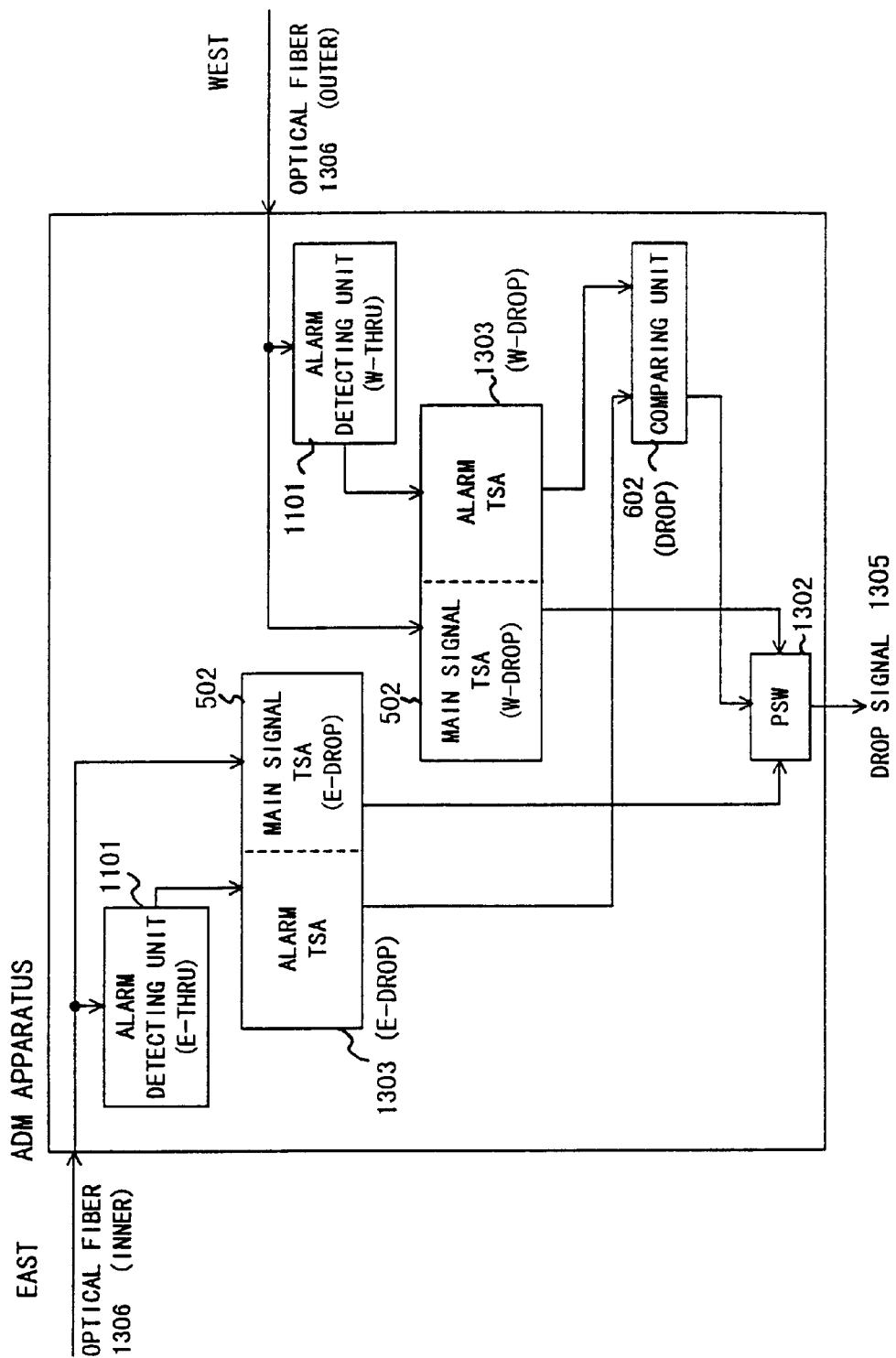
F I G. 14

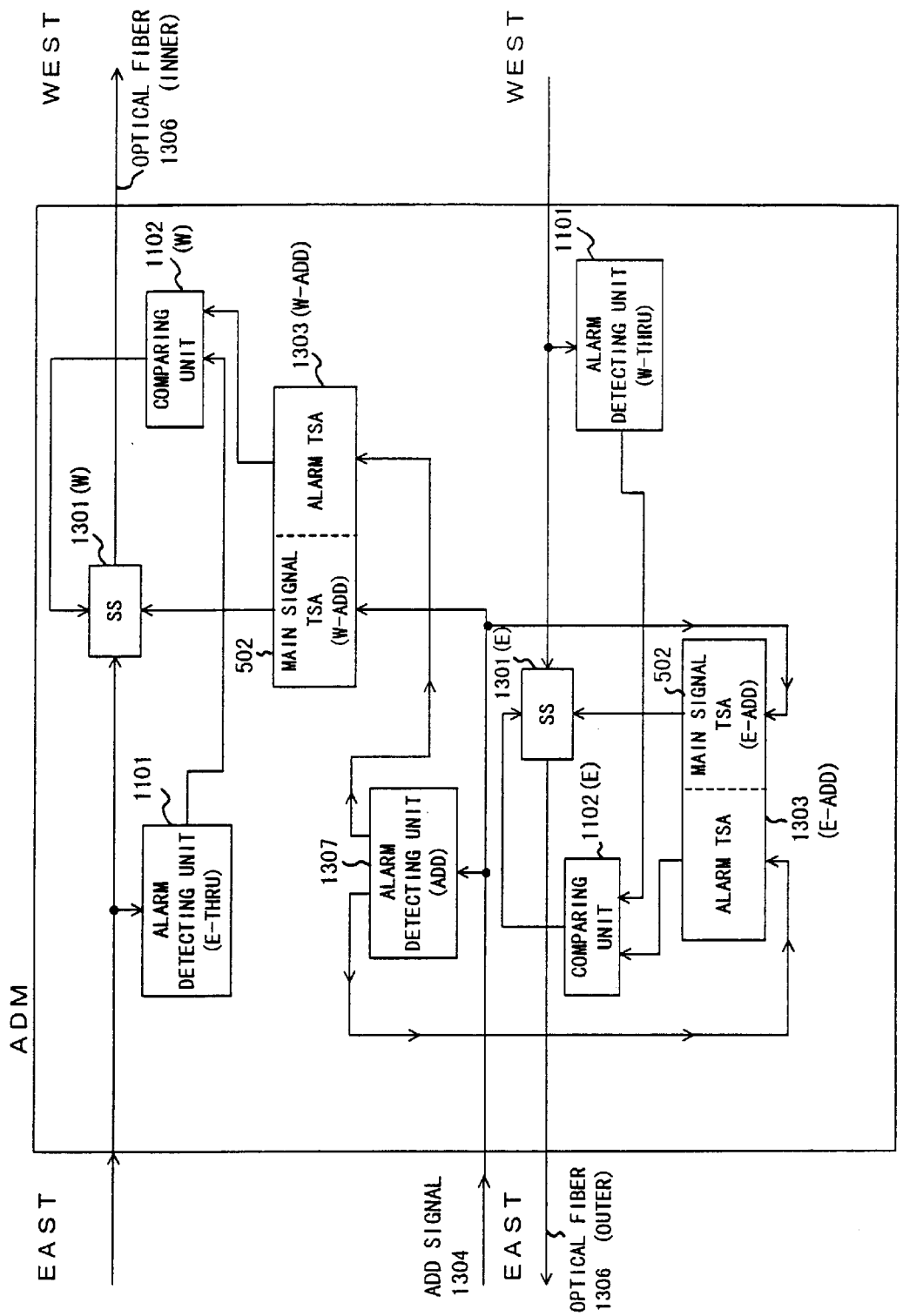
F I G. 15

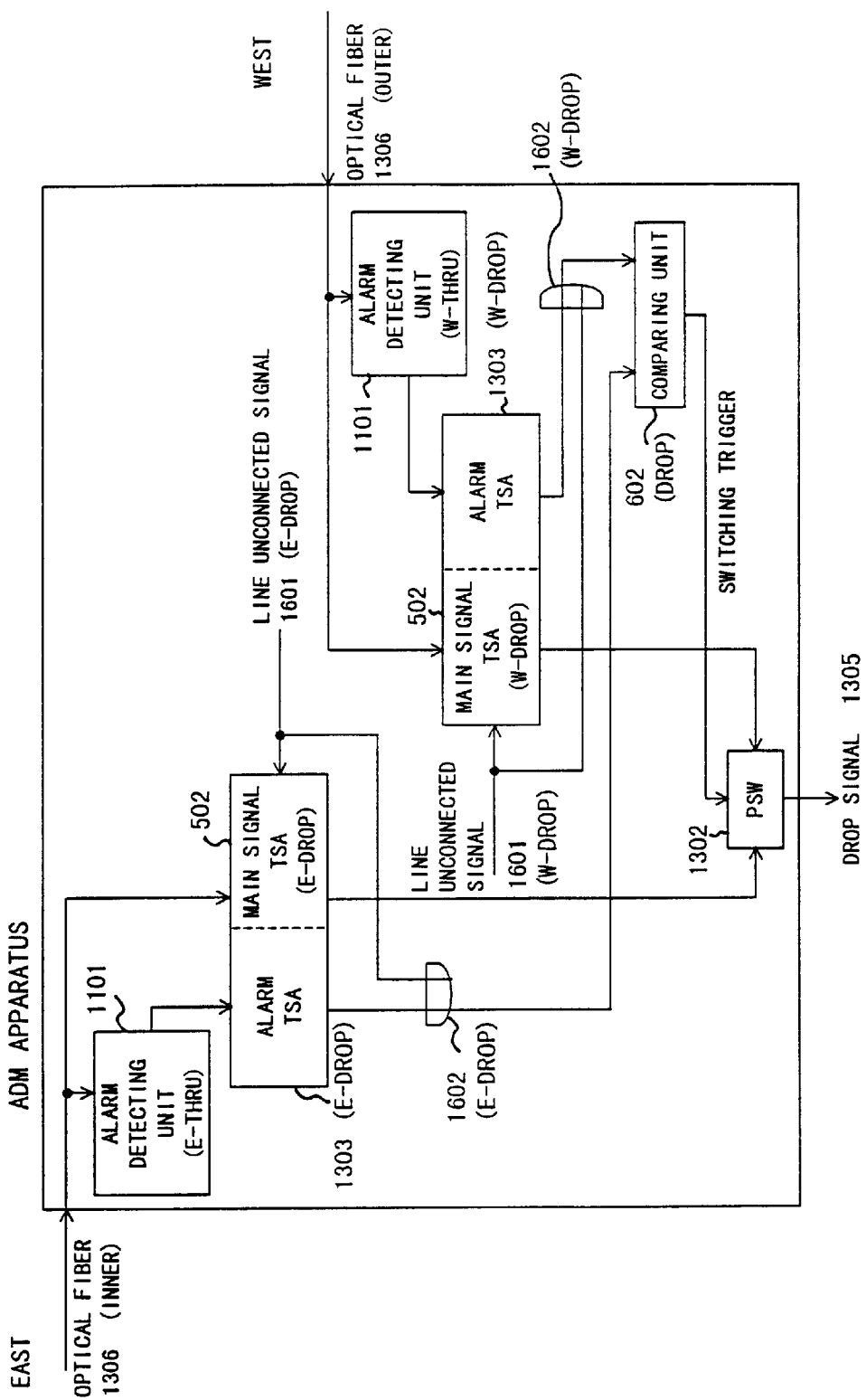
F I G. 16

| CONTENTS OF ALARM | SERIAL INTERFACE | | |
|---|---|---|---|
| | ALM FLAG 1 | ALM FLAG 2 | ALM FLAG 3 |
| LOP | 1 | 1 | 1 |
| PAIS | 1 | 1 | 0 |
| UNEQ | 1 | 0 | 1 |
| PLM | 1 | 0 | 0 |
| B3 MAJ | 0 | 1 | 1 |
| PDI | 0 | 1 | 0 |
| B3 MIN | 0 | 0 | 1 |
| NORMAL | 0 | 0 | 0 |

FIG. 23

PATH SWITCHING DEVICE FOR TRANSMISSION APPARATUS

BACKGROUND OF THE INVENTION

1. Field of the Invention

The present invention relates to a technology for processing alarms in a transmission apparatus such as an ADM apparatus with a path switch ring function by means of a path switch, and a bi-directional line switch ring function by means of a service selector, etc.

2. Description of the Related Art

These days, with the advent of large-scale and urbanized networks composing optical transmission systems, the implementation of an add drop multiplexer (ADM) apparatus is required in order to construct a ring type network which can cope with large-scale networks and the urbanization of networks.

When the ring type network implemented by an ADM apparatus is classified by a transmission form and a form of failure prevention, a path switch ring (uni-directional path switch ring)(hereinafter called PSR) and a bi-directional line switch ring (BLSR) are publicly known. However, both rings are required to be implemented by means of one ADM apparatus so that customers may construct an optimal network.

FIG. 1 shows the configuration of both an ADM apparatus and a general-purpose optical transmission network constructed using an ADM apparatus.

To implement this network ITU-T established an SDH transmission system, and in North America a transmission interface based on this transmission system and called a synchronous optical network (SONET) is used.

In the SONET interface a signal OC-N (or STS-N) is used which is based on a signal with a transmission rate of 51.84 Mbit/second called a synchronous transport signal-level 1(STS-1) or an optical carrier-level 1(OC-1), and has a transmission rate N (integer) times as fast as the STS-1 or OC-1 signal. In the example shown in FIG. 1, OC-3 (or STS-3), OC-12 (or STS-12) and OC-48 (or STS-48) with transmission rates 3, 12 and 48 times as fast as the STS-1 (OC-1) signal, respectively, are shown.

FIG. 2 shows the frame format of an STS-1 signal. The STS-N (OC-N) signal has a structure in which N pieces of STS-1 (OC-1) signals shown in FIG. 2 are multiplexed by way of byte multiplication.

As shown in FIG. 2, the STS-1 frame is divided into two areas, one area is called a transport overhead for transmitting overhead information, and the other area is called a synchronous payload envelope for transmitting payload information. Besides the information payload being user information, the synchronous payload envelope transmits overhead information called a path overhead. The transport overhead comprises an area called a section overhead and an area called a line overhead. The overhead area is used to transmit various kinds of control information and alarms between transmission apparatuses (ADM apparatus, etc.) composing a network.

The STS-1 frame shown in FIG. 2 is transmitted byte by byte in order from the top line to the bottom line, and from the left to the right.

In the information payload, digital signals of a plurality of users are multiplexed.

On the other hand, section, line and path overhead areas for classifying the overhead are concepts for identifying communication spans composing the SONET network.

The path specifies end-to-end connection between a transmission apparatus for generating one STS-1 frame and a transmission apparatus for terminating the frame, and the path overhead transmits overhead information communicated between both above-mentioned transmission apparatuses using the end-to-end connection. Although one STS-1 frame is transmitted via various kinds of physical media (OC-1, OC-3, OC-12 and OC-48) on the way, a path corresponding to the STS-1 signal is specified independently of those media.

The line specifies connection in which physical characteristics are continuous, more specifically connection between optical fiber spans with the same transmission rate, and the line overhead transmits overhead information communicated between transmission apparatuses at both ends of the physically continuous connection.

The section specifies connection between network elements such as a lightwave regenerator inserted between the above-mentioned lines, and the section overhead transmits overhead information communicated between the network elements.

As described above, since in the STS-1 frame, overhead information is layered and stored in an overhead area corresponding to both communication range and communication characteristics, and transmitted, and thereby, since it is sufficient for each network apparatus to process only overhead information related to itself, an efficient communication control can be implemented.

FIG. 3 shows the structure of the section overhead and line overhead in the transport overhead, and each overhead byte of a path overhead in a synchronous payload envelope. Out of these, overhead bytes particularly related to the present invention are described later.

Returning to the explanation of FIG. 1, ADM apparatuses 101 are apparatuses with a function to mutually connect optical fibers for ADD/DROP-transmitting OC (STS) signals with different transmission rates. The ADM apparatus 101 shown in FIG. 1, for example, connects an optical fiber for transmitting an OC-48 signal with an optical fiber for transmitting an OC-12 signal.

To implement the above-mentioned signal switching function, the ADM apparatus 101 comprises a time slot assigning (TSA) unit 102 and a multiplexer unit (THRU/ADD unit) 103.

The TSA unit 102 has a function to multiplex an arbitrary STS-1 frame multiplexed in the OC (STS) signal of the input side, to a signal with an arbitrary STS-1 frame timing in the OC signal of the output side, and has a configuration, for example, as shown in FIG. 4.

FIG. 4 shows the case where an input side main signal is an OC-48 main signal consisting of 48 channels, and where an output side main signal is an OC-N signal consisting of N channels.

Channels 1 to 48 (each channel corresponds to one STS-1 signal) of the input side main signal are inputted to N switches 401 #1 to #N. Each switch 401 is designated which channel to select and to output by a TSA control signal, and sends the channel at the STS-1 frame timing of the output side main signal to which the switch 401 is assigned.

In FIG. 1 the TSA unit 102 (DROP) multiplexes (drops) an arbitrary STS-1 frame multiplexed in the OC-48 signal being a higher order group side, to a signal with an arbitrary STS-1 frame timing in the OC-12 signal being a lower order group side.

On the other hand, the TSA unit 102 (ADD) multiplexes (adds) an arbitrary STS-1 frame multiplexed in the OC-12 signal being a lower order group side, to a signal with an arbitrary STS-1 frame timing in the OC-48 signal being a higher order group side, and an ADD signal obtained as this result is mixed with the OC-48 signal by the THRU/ADD unit 103.

Next, the PSR is described below.

FIG. 5 shows the configuration of the PSR.

An ADM apparatus 501 used in a PSR configuration comprises TSA units 502 (E-ADD) and 502 (W-ADD) and THRU/ADD (T/A) units 503 (E) and 503 (W) for multiplexing (adding) an ADM signal 505 from a lower order group side optical fiber, to a higher order group optical fiber, TSA units 502 (E-DROP) and 502 (W-DROP) for multiplexing (dropping) a DROP signal 506 from a higher order group side optical fiber, to a lower order group side optical fiber, and a path switch (PSW) 504.

Then, in an ADM apparatus 501(#1) an ADD signal 505 (#1) from a lower order group side optical fiber is added to an outer optical fiber 507(OUTER) by the operation of both TSA unit 502(E-ADD) and THRU/ADD unit 503(E), and is added to an inner optical fiber 507(INNER) by the operation of both TSA unit 502(W-ADD) and THRU/ADD unit 503 (W). In this way, over both optical fiber 507(OUTER) and optical fiber 507(INNER) the same optical signal is transmitted.

The optical signal added from the ADM apparatus 501#1 and redundantly transmitted on dual rings, for example, is dropped at the ADM apparatus 501#2.

That is, in the ADM apparatus 501#2, an optical signal from the optical fiber 507(OUTER) is dropped by the TSA unit 502(W-DROP), and an optical signal from the optical fiber 507(INNER) is dropped by the TSA unit 502(E-DROP). Basically both TSA unit 502(W-DROP) and TSA unit 502(E-DROP) drop the same signal.

As shown in FIG. 6, the ADM apparatus 501 comprises an alarm detecting unit 601 (W-DROP) for detecting alarms in the overhead area (see FIGS. 2 and 3) of one or more STS-1 frames provided in the signal dropped by the TSA unit 502(W-DROP), an alarm detecting unit 601(E-DROP) for detecting alarms from each of the overhead areas of one or more STS-1 frames provided in the signal dropped by the TSA unit 502(E-DROP), and a comparing unit 602 for comparing an alarm detected on the W-DROP side with an alarm detected on the E-DROP side for each STS-1 frame timing.

That is, the TSA unit 502 has a configuration as shown in FIG. 4. As shown in FIG. 7, signals are cross-connected in a form where a main signal and an overhead area containing alarm information are mixed, and the alarm detecting unit 601 detects alarms by separating both the main signal and the overhead area containing alarm information from the output.

Then in FIGS. 5 and 6, a path switch (PSW) 504 selects an output in which alarms are not detected by the comparing unit 602 (DROP) (if alarms are not detected in both outputs, a default signal is output) out of the outputs of both TSA unit 502 (W-DROP) and TSA unit 502 (E-DROP) for each STS-1 frame timing in the lower order group side signal, and outputs the output to the lower order group side optical fiber as a DROP signal 506.

In this way, the ADM apparatus 501#2 can select a signal in which abnormalities are not detected, that is, a normal signal out of both the STS-1 signal transmitted on the outer optical fiber 507 (OUTER) and the STS-1 signal transmitted on the inner optical fiber 507(INNER), and drop the signal to the lower order group side optical fiber. That is, the ADM apparatus 501 with a PSR configuration is characterized in that a network configuration in which dual rings in one network can be selected in units of STS-1 frames as a running path and a stand-by path,can be implemented.

On the contrary, for an optical signal transmitted from the lower order group side optical fiber connected to the ADM apparatus 501#2, to the lower order group side optical fiber connected to the ADM apparatus 501#1, ADD/DROP processing for each of the optical fibers 507(OUTER) and 507(INNER) composing the PSR can be implemented by each of the above-mentioned ADM apparatuses 501#1 and 501#2 executing an operation the reverse of the above-mentioned operation.

It must be noted that as shown in FIG. 6, in order to control the PSW 504, it is necessary for the ADM apparatus 501 with the above-mentioned PSR function to comprise two alarm detecting units 601(W-DROP) and 601(E-DROP) for detecting alarms from the outputs of the TSA units 502(W-DROP) and 502(E-DROP), respectively.

Nest, the BLSR is described below.

FIG. 8 shows the bridge configuration of a plurality of rings in which an ADM apparatus 801 which has a BLSR configuration is used, and FIGS. 9 and 10 explain the failure restoration carried out by the rings.

The ADM apparatus with a BLSR configuration can easily connect two ring networks redundantly.

That is, it is assumed here that when two networks RING1 and RING2 are connected with each other by both PRIMARY ADM apparatus 801 composing RING1 and PRIMARY ADM apparatus 801 composing RING2, a failure, etc. occurs in either of the STS-1 frames of the OC (STS) signal transmitted on the connecting line.

In this case, as shown in FIG. 11, the respective PRIMARY ADM apparatuses 801 in RING1 and RING2 cut the connection between both PRIMARY ADM apparatuses 801 only for STS-1 frame timings in which there is a failure, etc., by controlling a unit called a service selector (SS) 803, and put an optical fibers 802(OUTER) and 802(INNER) in a through state. As for STS-1 frame timings in which there is no failure, etc., the current connection is maintained.

Simultaneously, as shown in FIG. 10, the respective SECONDARY ADM apparatuses 801 in RING1 and RING2 modify the through control for both optical fibers 802 (OUTER) and 802(INNER) in each ring only for STS-1 frame timings in which there is the above-mentioned failure, by controlling the SS 803, and establishes connection between both SECONDARY ADM apparatuses 801.

In this way, the ADM apparatus with a BLSR configuration 801 can switch over a work line to a protection line, and vice versa in units of STS-1 frames between two networks.

The detailed operation of the ADM apparatus for implementing the above-mentioned function is described below referring to FIGS. 8 and 11.

First, the operation in the case where connection is established between the respective PRIMARY ADM apparatuses 801 of RING1 and RING2, is described.

In the PRIMARY ADM apparatus 801 of RING1, a selector (E/W SEL) 804 selects an optical signal dropped from the inner optical fiber 802(INNER) of RING1 by the TSA unit 502(E-DROP) out of both optical signals dropped from the inner optical fiber 802(INNER) of RING1 by the TSA unit 502(E-DROP) and the optical signal dropped from the outer optical fiber 802(OUTER) of RING1 by the TSA unit 502(W-DROP), and outputs the optical signal to the RING2 side.

On the other hand, in the SECONDARY ADM apparatus 801 of RING2, an SS 803(W) selects an optical signal from RING1 added by the TSA unit 502(W-ADD) out of both the optical signal from RING1 added by the TSA unit 502(W-ADD) and optical signal input from the inner optical fiber 802(INNER) of RING2, and outputs the optical signal to the optical fiber 802(INNER) of RING2.

On the contrary, in the PRIMARY ADM apparatus 801 of RING2, a selector (E/W SEL) 804 selects an optical signal dropped from the outer optical fiber 802(OUTER) of RING2 by the TSA unit 502(W-DROP) out of both the optical signal dropped from the outer optical fiber 802(OUTER) of RING2 by the TSA unit 502(W-DROP) and the optical signal dropped from the inner optical fiber 802(INNER) of RING2 by the TSA unit 502(E-DROP), and outputs the optical signal to the RING1 side.

On the other hand, in the PRIMARY ADM apparatus 801 of RING1, an SS 803(E) selects an optical signal from RING2 added by the TSA unit 502(E-ADD) out of both the optical signal from RING2 added by the TSA unit 502(E-ADD) and the optical signal input from the outer optical fiber 802(OUTER) of RING1, and outputs the optical signal to the optical fiber 802(OUTER) of RING1.

In the PRIMARY ADM apparatus 801 of RING1, an SS 803(E) selects an optical signal from RING2 added by the TSA unit 502(E-ADD) out of both the optical signal from RING2 added by the TSA unit 502(E-ADD) and the optical signal input from the optical fiber 802(OUTER) of RING1, and outputs the optical signal to the optical fiber 802(OUTER) of RING1.

In the PRIMARY ADM apparatus 801 of RING1, an SS 803(W) selects an optical signal input from the optical fiber 802(INNER) of RING1 out of both the optical signal from RING2 added by the TSA unit 502(W-ADD) and the optical signal input from the optical fiber 802(INNER) of RING1, and puts each STS-1 frame in the optical fiber 802(INNER) of RING1 in a through state.

In the same way, in the PRIMARY ADM apparatus 801 of RING2, an SS 803(E) selects an optical signal input from the optical fiber 802(OUTER) of RING2 out of both the optical signal from RING1 added by the TSA unit 502(E-ADD) and the optical signal input from the optical fiber 802(OUTER) of RING2, and puts each STS-1 frame in the optical fiber 802(OUTER) of RING2 in a through state.

In this way, connection as shown in FIG. 9 is established between the PRIMARY ADM apparatuses 801 of RING1 and RING2.

The operation in this case of the respective SECONDARY ADM apparatuses 801 of RING1 and RING2 is described below.

In the SECONDARY ADM apparatus 801 of RING1 a selector (E/W SEL) 804 selects an optical signal dropped from the inner optical fiber 802(INNER) of RING1 by the TSA unit 502(E-DROP) out of both the optical signal dropped from the inner optical fiber 802(INNER) of RING1 by the TSA unit 502(E-DROP) and the optical signal dropped from the outer optical fiber 802(OUTER) of RING1 by the TSA unit 502(W-DROP), and outputs the optical signal to the RING2 side.

On the other hand, in the PRIMARY ADM apparatus 801 of RING2, an SS 803(W) selects an optical signal input from the inner optical fiber 802(INNER) of RING2 out of both the optical signal from RING1 added by the TSA unit 502(W-ADD) and the optical signal input from the inner optical fiber 802(INNER) of RING2, and puts each STS-1 frame in the optical fiber 802(INNER) of RING2 in a through state.

On the contrary, in the SECONDARY ADM apparatus 801 of RING2, a selector (E/W SEL) 804 selects an optical signal dropped from the outer optical fiber 802(OUTER) of RING2 by the TSA unit 502(W-DROP) out of both the optical signal dropped from the outer optical fiber 802 (OUTER) of RING2 by the TSA unit 502(W-DROP) and the optical signal dropped from the inner optical fiber 802 (INNER) of RING2 by the TSA unit 502(E-DROP), and outputs the optical signal to the RING1 side.

On the other hand, in the SECONDARY ADM apparatus 801 of RING1, an SS 803(E) selects an optical fiber input from the outer optical fiber 802(OUTER) of RING1 out of both the optical fiber from RING2 added by the TSA unit 502(E-ADD) and the optical fiber input from the outer optical fiber 802(OUTER) of RING1, and puts each STS-1 frame in the optical fiber 802(OUTER) of RING1 in a through state.

In this way, a through connection shown in FIG. 9 is established in the respective SECONDARY ADM apparatuses 801 of RING1 and RING2.

It is assumed that in the above-mentioned connecting state shown in FIG. 9 there is a failure, etc. in either of the STS-1 frames of the OC(STS) signal transmitted on the connection line between the PRIMARY ADM apparatuses 801 of RING1 and RING2.

In this case, the connection controlling state shown in FIG. 10 is implemented for the STS-1 frame timing in which there is a failure, etc. by carrying out control the exact reverse of the above-mentioned control, in the respective PRIMARY ADM apparatuses 801 and the respective SECONDARY ADM apparatuses 801 of RING1 and RING2.

The ADM apparatus with a BLSR configuration 801 is provided with an alarm detecting mechanism as shown in FIG. 11, so that the ADM apparatus with a BLSR configuration 801 may implement the above-mentioned control for the avoidance of failure.

First, the ADM apparatus 801 comprises an alarm detecting unit 1101 (E-ADD) for detecting alarms from the overhead area (see FIGS. 2 and 3) of one or more STS-1 frames multiplexed in an OC(STS) signal cross-connected with an ADD signal 1103 by the TSA unit 502(E-ADD) and added to an optical fiber 1105(OUTER) by the TSA unit 502(W-DROP), an alarm detecting unit 1101(W-THRU) for detecting alarms from the overhead area of one or more STS-1 frames multiplexed in an OC(STS) signal input the optical fiber 1105(OUTER), and a comparing unit 1102(E) for comparing an alarm detected in the E-ADD side with an alarm detected on the W-THRU side for each STS-1 frame timing.

The SS 803(E) selects an output in which alarms are not detected by the comparing unit 1102 (E) (if alarms are not detected in both outputs, a default is output) out of both the output of the TSA unit 502 (E-ADD) and the input from the optical fiber 1105(OUTER) for each STS-1 frame timing, and outputs the output to the optical fiber 1105(OUTER).

In the same way, the ADM apparatus 801 comprises an alarm detecting unit 1101 (W-ADD) for detecting alarms from the overhead area of one or more STS-1 frames multiplexed in an OC(STS) signal cross-connected with an ADD signal 1103 and added to an optical fiber 1105 (INNER) by the TSA unit 502(W-ADD), an alarm detecting unit 1101(E-THRU) for detecting alarms from the overhead area of one or more STS-1 frames multiplexed in an OC(STS) signal input from the optical fiber 1105(INNER), and a comparing unit 1102(W) for comparing an alarm detected in the W-ADD side with an alarm detected on the E-THRU side for each STS-1 frame timing.

The SS 803(W) selects an output in which alarms are not detected by the comparing unit 1102 (W) (if alarms are not detected in both outputs, a default is output) out of both the output of the TSA unit 502 (W-ADD) and the input from the optical fiber 1105(INNER) for each STS-1 frame timing, and outputs the output to the optical fiber 1105(INNER).

In this way, the connection between the PRIMARY ADM apparatuses 801 of RING1 and RING2 and the connection between the SECONDARY ADM apparatuses 801 of RING1 and RING2 can be switched over between each other in units of STS-1 frames. That is, the ADM apparatus 801 with a BLSR function is characterized in a network configuration in which both work line and protection line can be secured in units of STS-1 frames between two networks.

It must be noted that, as shown in FIG. 11, it is necessary for the ADM apparatus 801 with the above-mentioned BLSR function to comprise four alarm detecting units 1101(E-ADD), 1101(W-ADD), 1101(W-THRU) and 1101 (E-THRU) for detecting each alarm in the respective outputs from the TSA units 502(E-ADD) and 502(W-ADD) and the respective input from the optical fibers 1105(OUTER) and 1105(INNER).

Although, as described above, conventionally two kinds of ADM apparatus, an ADM apparatus with a PSR function and an ADM apparatus with a BLSR function, are publicly known, it is required that both rings can be implemented by means of one ADM apparatus so that customers may construct an optimal network in accordance with their purposes.

From this point of view, the incorporation of the configuration of an ADM apparatus with the PSR function 501 shown in FIG. 6 and the configuration of an ADM apparatus with the BLSR function 801 shown in FIG. 11 is considered. FIG. 12 shows the configuration of a conventional ADM apparatus with both the PSR function and BLSR function.

Since the respective configuration of four TSA units 502(E-ADD), 502(W-ADD), 502(E-DROP) and 502(W-DROP) in both FIGS. 6 and 11 is the same, the four TSA units 502 can be commonly used for both the PSR function and BLSR function as shown in FIG. 12.

The applied positions of both THRU/ADD unit 503(E) shown in FIG. 6 and SS 803(E) shown in FIG. 11 are the same. For this reason, as shown in FIG. 12, both units can be commonly used for both PSR function and BLSR function. The same applies to both THRU/ADD unit 503(W) shown in FIG. 6 and SS 803(W) shown in FIG. 11.

The applied positions of both PSW 504 shown in FIG. 6 and E/W SEL 804 shown in FIG. 11 are the same. For this reason, as shown in FIG. 12, by implementing one unit with the function of both units, the unit can be commonly used for both the PSR function and BLSR function.

Next, the alarm detecting unit is described.

In order to control a PSW 504 for implementing the PSR function as an alarm detecting unit, two alarm detecting units 601(W-DROP) and 601(E-DROP) for detecting each alarm in the respective output of TSA units 502(W-DROP) and 502(E-DROP), and one comparing unit 602(DROP) are needed. Since these alarm detecting units 601 have to detect an alarm from the overhead area of one or more STS-1 frames multiplexed in an OC(STS) signal after dropping, the alarm detecting units 601 have to be provided on the respective output side of TSA units 502(W-DROP) and 502(E-DROP).

On the other hand, in order to control two SS 803s for implementing the BLSR function, four alarm detecting units 1101(E-ADD), 1101(W-ADD), 1101(W-THRU) and 1101 (E-THRU) for detecting each alarm from the respective outputs of TSA units 502(E-ADD) and 502(W-ADD) and optical fibers 1105(OUTER) and 1105(INNER), and two comparing units 1102(E) and 1102(W) are needed. Since out of these units two alarm detection units 1101(E-ADD) and 1101(W-ADD) have to detect an alarm from the respective overhead area of one or more STS-1 frames multiplexed in an OC(STS) signal after adding, the alarm detecting units 1101 have to be provided on the respective output sides of TSA units 502(E-ADD) and 502(W-ADD). Since two alarm detecting units 1101(W-THRU) and 1101(E-THRU) have to detect an alarm from the respective overhead area of one or more STS-1 frames multiplexed in an OC(STS) signal in the optical fibers 1105, the two alarm detecting units 1101 have to be provided on the respective input sides of those optical fibers 1105.

In this way, it is understood that in a conventional ADM apparatus with both PSR function and BLSR function, six alarm detecting units in total are required.

However, since the alarm detecting unit has to detect a predetermined byte value from each area of the section overhead, line overhead and path overhead of the frame for each STS-1 frame with the structure shown in FIG. 2 in a target OC(STS) signal, and has to execute judging and calculating processes, the circuitry scale of the alarm detecting unit becomes large.

Therefore, as shown in FIG. 12, the system has a problem that the provision of six alarm detecting units leads to a large-scale ADM apparatus, which causes an increase in the cost of the ADM apparatus.

SUMMARY OF THE INVENTION

The present invention has been made from the above-mentioned background, and it is an object of the present invention to reduce the scale of hardware needed to detect alarms.

One mode of the present invention presumes a transmission apparatus comprising a first main signal frame switching unit (TSA unit 502(E-DROP)) for executing a first frame switching process for each of all or a part of frames (STS-1 frame) in a first transmission signal on a first line (optical fiber 106(INNER) to which one or more frames including an area for displaying alarms, are multiplexed, a second main signal frame switching unit (TSA unit 502(W-DROP)) for executing a second frame switching process for each of all or a part of frames (STS-1 frame) in a second transmission signal on a second line (optical fiber 106(OUTER) to which one or more frames including an area for displaying alarms, are multiplexed, a switching unit (PSW 1302) for selecting either output of the first and second main signal frame switching processes and outputting the output to a third line, a third and fourth main signal frame switching unit (TSA units 502(W-ADD) and 502(E-ADD)) for executing third and fourth frame switching processes for each of all or a part of frames in a fourth transmission signal on a fourth line to which one or more frames including an area for displaying alarms, are multiplexed, a first service selector unit (SS 1301(W)) for selecting either output of the third main signal frame switching unit or input of a first line in units of frames and outputting the output or input to the first line, and a second service selector unit (SS 1301(E)) for selecting either the output of the fourth main signal frame switching unit or the input of a second line in units of frames and outputting the output or input to the second line. Generally speaking, a transmission apparatus like this is implemented as an ADM apparatus with both the path switching function and bi-directional line switching function.

In the present invention, a first alarm detecting unit (alarm detecting unit 1101(E-THRU)) detects each alarm corresponding to each frame contained in a first transmission signal, from the input side of the first transmission signal.

A second alarm detecting unit (alarm detecting unit 1101 (W-THRU)) detects each alarm corresponding to each frame contained in a second transmission signal, from the input side of the second transmission signal.

First and second alarm switching unit (alarm TSA apparatuses 1303 (E-DROP) and 1303 (W-DROP)) execute the switching processes in the same frame order as the first and second main signal frame switching processes, respectively for an alarm of the respective frame output by the first and second alarm detecting unit.

A first comparing unit (comparing unit 602 (DROP)) makes the switching unit select either of the outputs of the first and second main signal frame switching processes, in units of frames, by comparing alarms of the respective frame output by the first and second alarm switching unit with each other.

A third alarm detecting unit (alarm detecting unit 107 (ADD)) detects each alarm corresponding to each frame contained in a fourth transmission signal, from the fourth transmission signal.

Third and fourth alarm switching unit (alarm TSA apparatuses 1303 (W-ADD) and 1303 (E-ADD)) execute the switching process in the same frame order as the third and fourth main signal frame switching processes, respectively for an alarm for each frame outputted by the third alarm detecting unit.

Second and third comparing unit (comparing units 1102 (W) and 1102 (E)) control the first and second service selector unit by comparing an alarm for each frame output by the third and fourth alarm switching unit with an alarm for each frame detected by the first and second alarm detecting unit.

By adopting the above-mentioned configuration of the present invention, in a transmission apparatus such as an ADM apparatus with both the path switch ring function and bi-directional line switch ring function, the number of alarm detecting unit with large-scale circuitry can be reduced, and the scale of hardware can also be greatly reduced compared with the prior art.

The present invention can be so constructed that an OR operation may be executed by both the alarm for each frame output by the first and second alarm switching unit or the third and fourth alarm switching unit, and the signal indicating that a line is set to "unconnected" for each frame, and that the result of the operation may be input to the first comparing unit, or the second and third comparing unit.

By adopting this configuration, a line unconnected state can be easily set for a transmission apparatus.

In the above-mentioned configuration of the present invention, the present invention can be so constructed as to further comprise an alarm reporting circuit for reporting the respective alarm for each frame outputted by the first and second alarm switching circuits or the respective alarm for each frame outputted by the third and fourth alarm switching circuits, and the respective alarm for each frame outputted by the first and second alarm detecting circuits, as alarm monitor information.

By adopting this configuration, the detected state of various kinds of alarms in a transmission apparatus can be monitored externally.

Furthermore, the above-mentioned invention can be so configured as to further comprise a coding unit for coding each alarm input to the first and second alarm switching unit or each alarm input to the third and fourth alarm switching unit, and a decoding unit for decoding each coded alarm output from the first and second alarm switching unit or each encoded alarm output from the third and fourth alarm switching unit.

By adopting this configuration, the bit number of each alarm detection result signal to be processed by an alarm switching unit can be further reduced, and the hardware scale of the transmission apparatus can be further reduced.

BRIEF DESCRIPTION OF THE DRAWINGS

Other objects and characteristics of the present invention will be more apparent to a person having ordinary skill in the art from the following detailed description of the preferred embodiments in conjunction with the accompanying drawings, in which:

FIG. 14 shows the configuration of the path switch ring function in the first preferred embodiment of the ADM apparatus.

FIG. 15 shows the configuration of the bi-directional line switch ring in the first preferred embodiment of the ADM apparatus.

FIG. 16 shows the configuration of the path switch ring function in the second preferred embodiment of the ADM apparatus.

FIG. 23 explains the contents of alarms.

DESCRIPTION OF THE PREFERRED EMBODIMENT

Each of the preferred embodiments of this invention is described in detail below with reference to the drawings.

The First Preferred Embodiment

Figure 13:
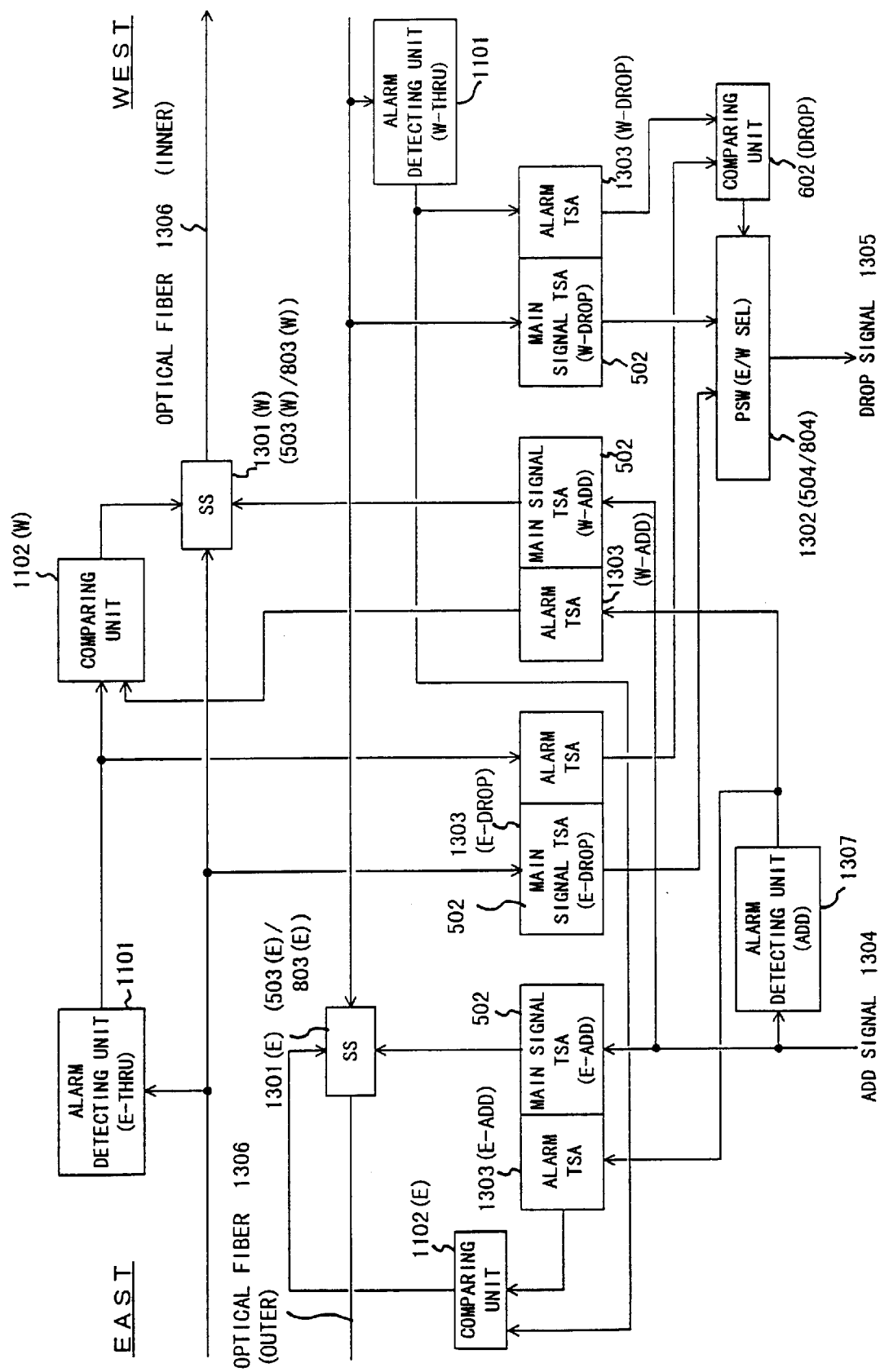
FIG. 13 shows the configuration of the first preferred embodiment of an ADM apparatus of this invention with both the path switch ring function and bi-directional line switch ring function.

FIG. 13 shows the configuration of the first preferred embodiment of an ADM apparatus of this invention, with both the path switch ring (PSR) function and bi-directional line switch ring (BLSR) function. In FIG. 14, the portion related to the PSR function is extracted from the configuration shown in FIG. 13.

In FIG. 15, the portion related to the BLSR function is extracted from the configuration shown in FIG. 13.

In the configuration shown in FIGS. 13 to 15, the components with the same numbers as the conventional ADM apparatus shown in FIGS. 5, 6, 8, 11 and 12 represent components with the same functions.

Figure 5:
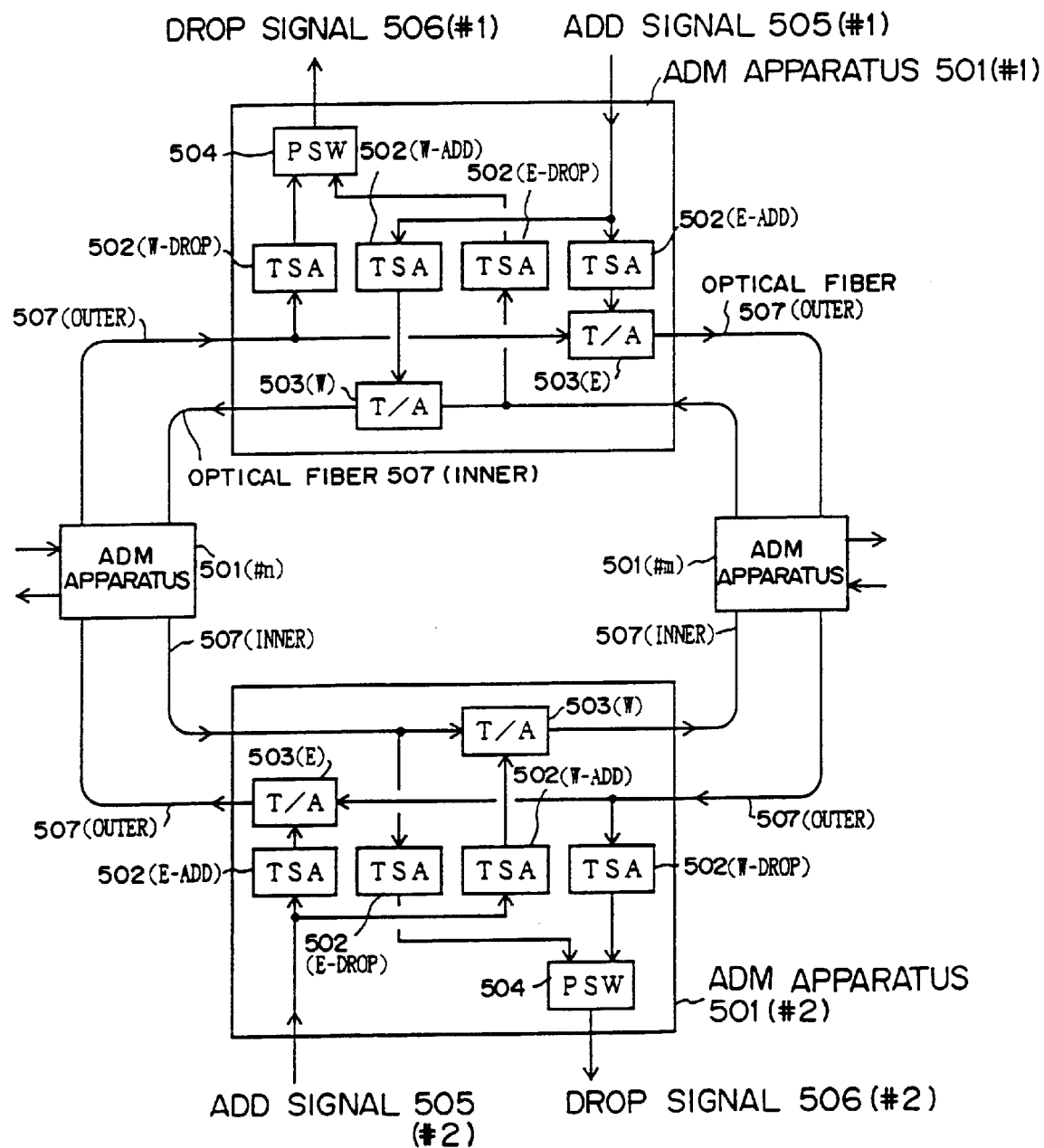
FIG. 5 shows the configuration of a path switch ring.
Figure 6:
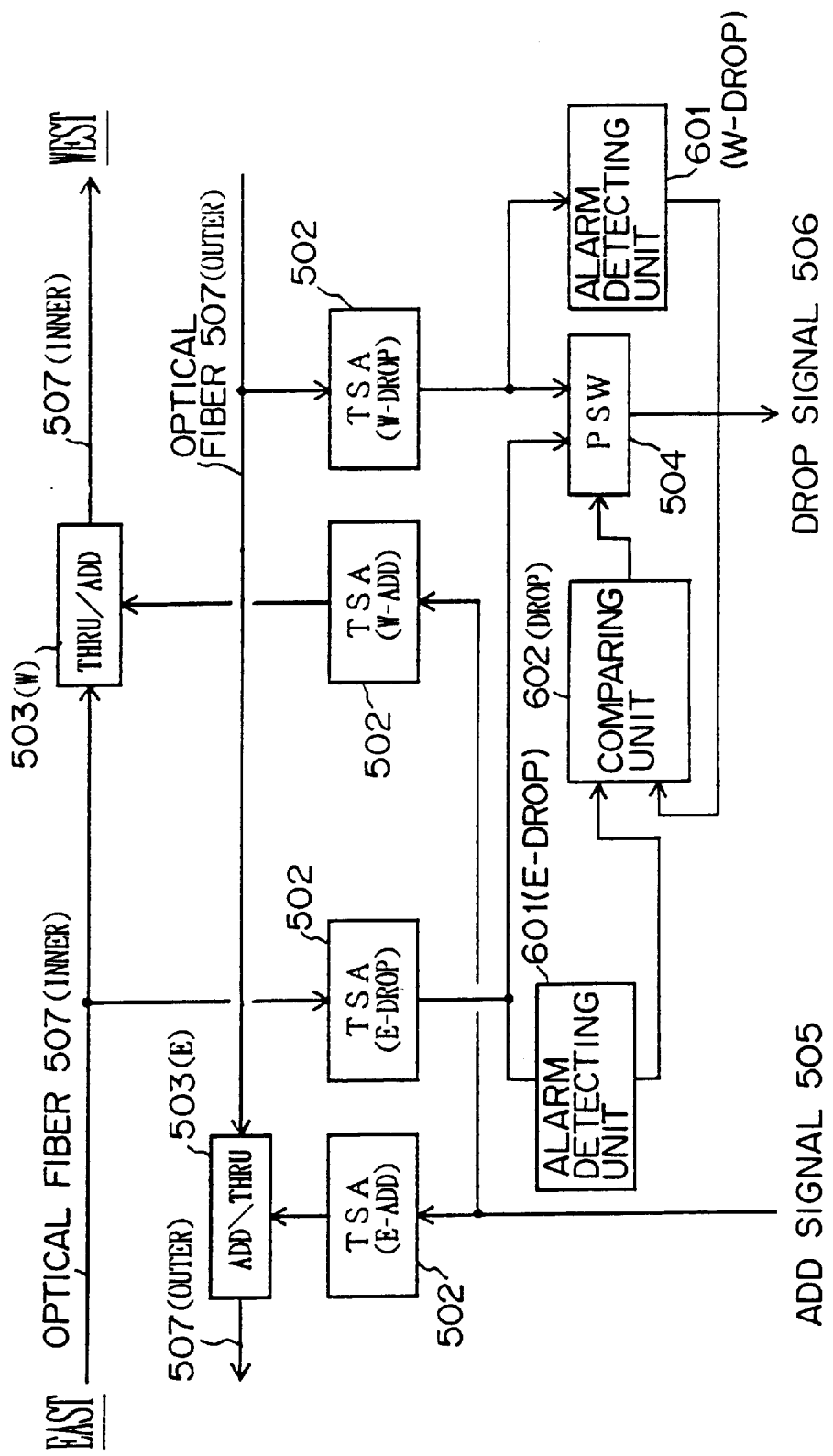
FIG. 6 shows the configuration of a conventional ADM apparatus with a path switch ring function.
Figure 7:
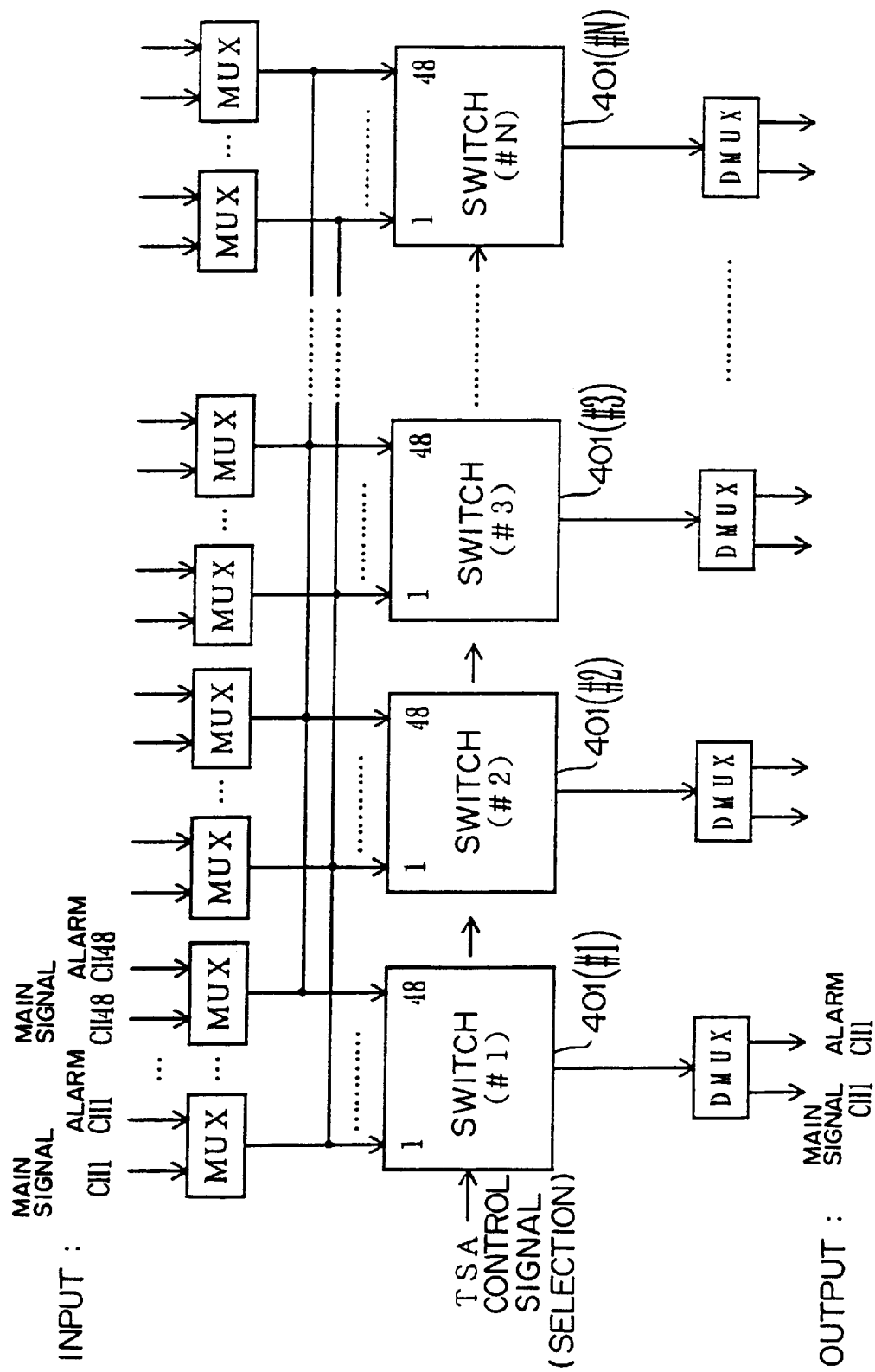
FIG. 7 shows the configuration of a conventional TSA apparatus.

Main signal TSA apparatuses 502 (E-DROP), 502 (W-DROP), 502 (E-ADD) and 502 (W-ADD) shown in FIGS. 13 to 15 are the same as the TSA apparatuses 502 (E-DROP), 502 (W-DROP), 502 (E-ADD) and 502 (W-ADD) shown in FIG. 5, which are provided with a function of cross-connecting an OC-48 main signal including 48 channels of STS-1 frames.

Both SS 1301 (E) and SS 1301 (W) have both the function of conventional THRU/ADD apparatuses 503 (E) and 503 (W) shown in FIG. 5, and the function of conventional SS 803 (E) and SS 803 (W).

Figure 8:
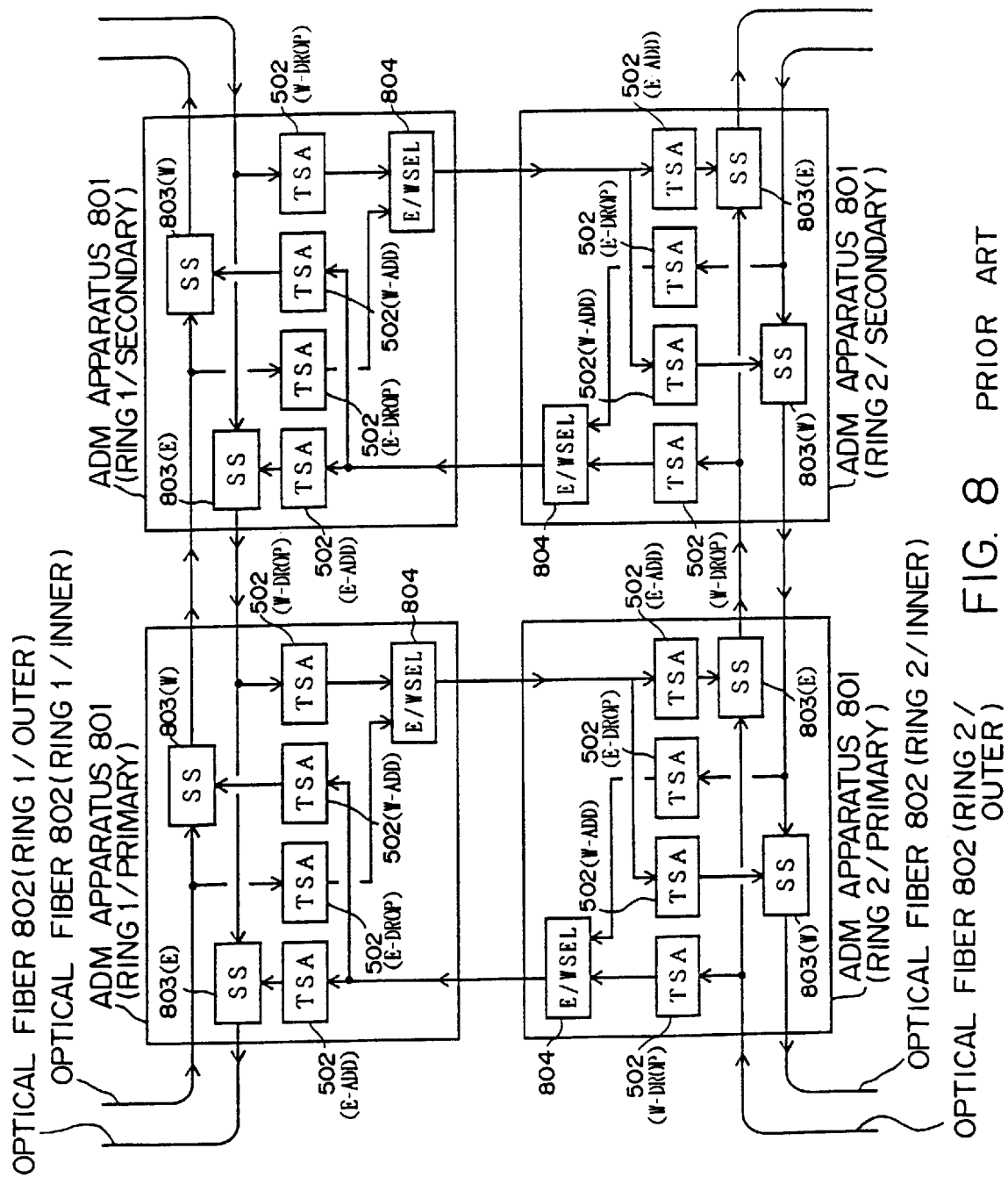
FIG. 8 shows the bridge structure of a plurality of rings using a bi-directional line switch ring.
Figure 9:
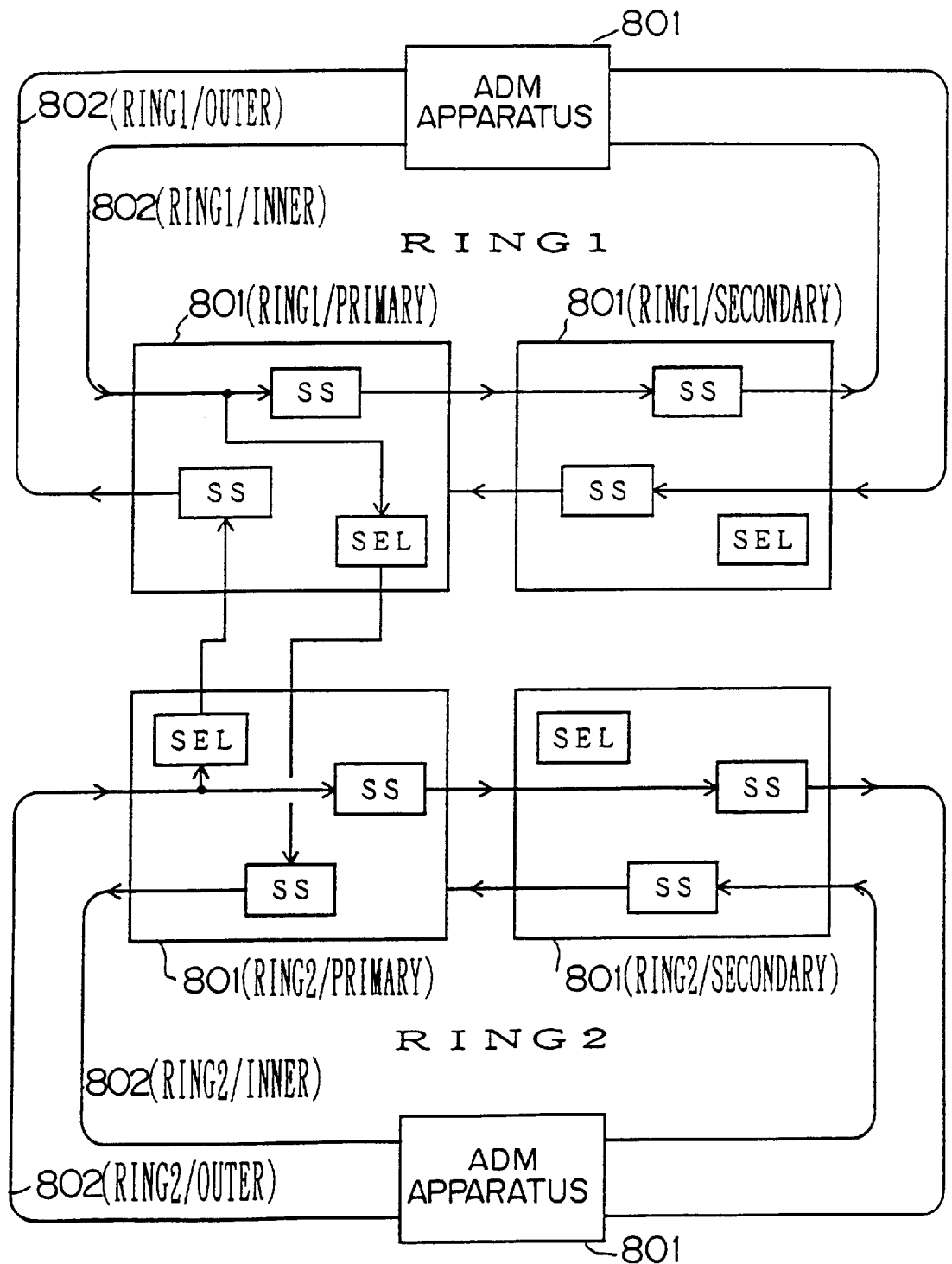
FIG. 9 explains the bridge structure of a plurality of rings using a bi-directional line switch ring (No.1).
Figure 10:
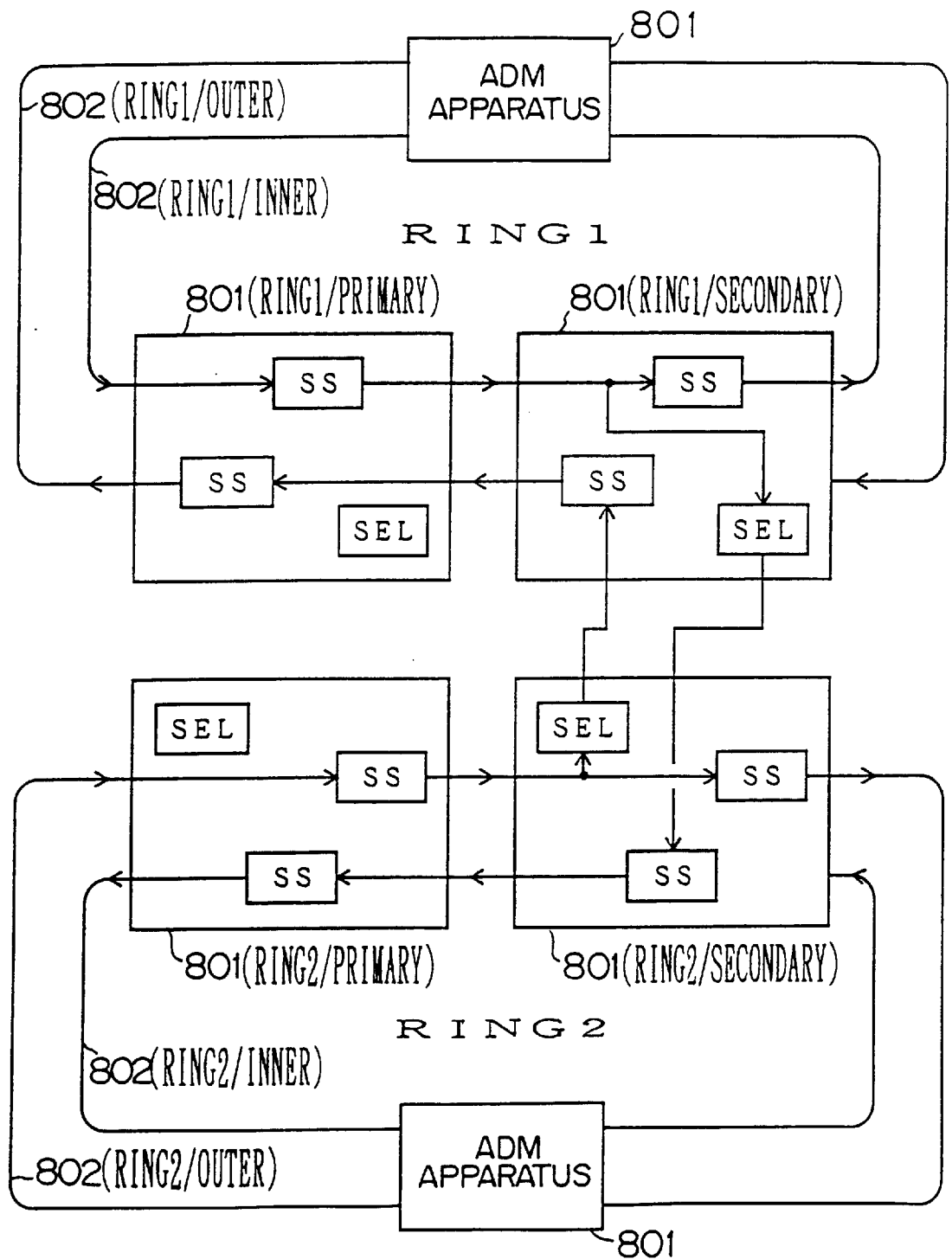
FIG. 10 explains the bridge structure of a plurality of rings using a bi-directional line switch ring (No.2).
Figure 11:
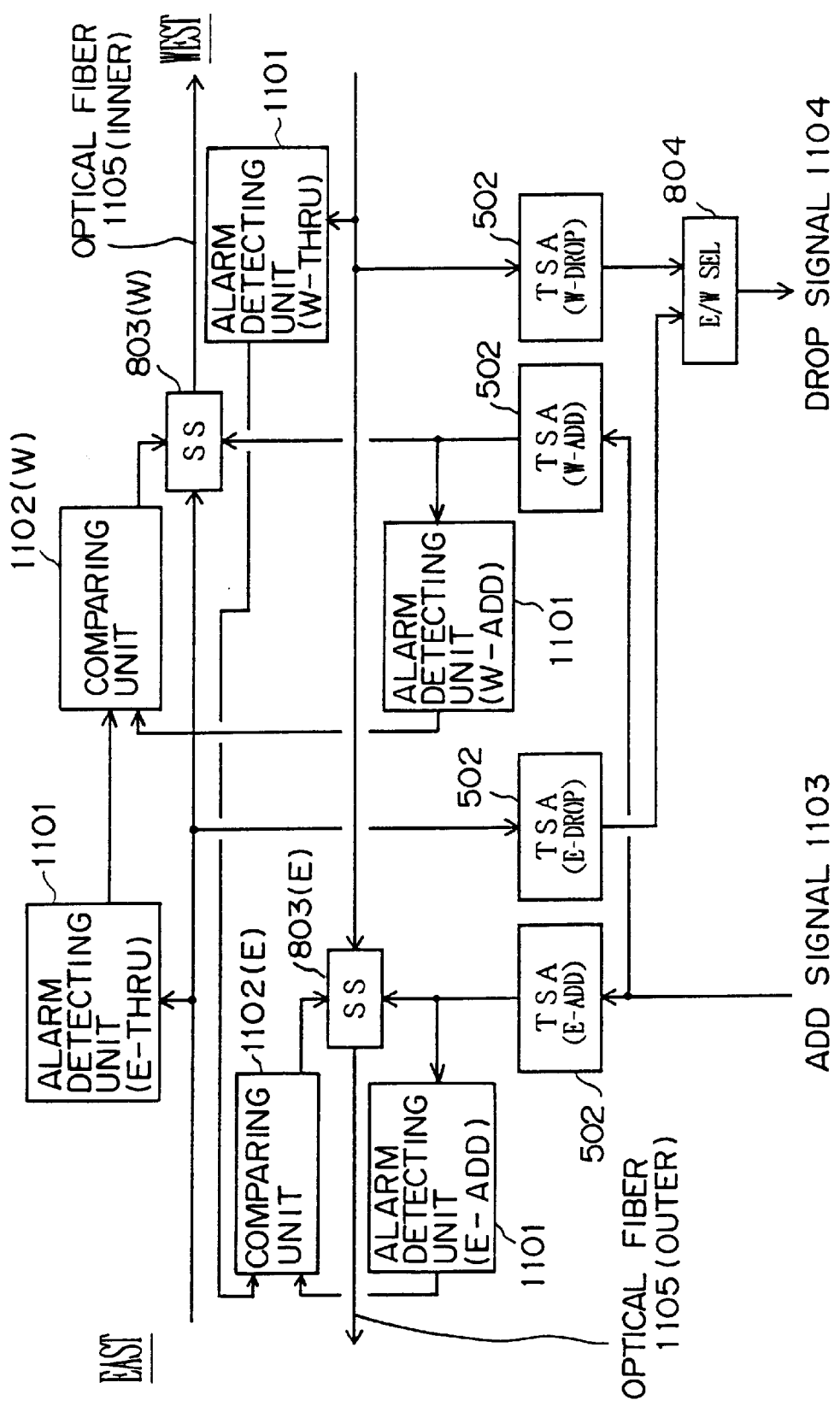
FIG. 11 shows the configuration of a conventional ADM apparatus with a bi-directional line switch ring function.

PSW 1302 has both the function of a conventional PSW 504 shown in FIG. 5, and the function of a conventional E/W SEL 804 shown in FIG. 8.

Optical fibers 106 (OUTER) and 106 (INNER) are the same as optical fibers 507 (OUTER) and 507 (INNER), respectively, as shown in FIG. 5, and are the same as optical fibers 802 (OUTER) and 802 (INNER), respectively, as shown in FIG. 8.

Furthermore, both ADD signal 1304 and DROP signal 1305 are the same as an ADD signal 505 and a DROP signal 506, respectively, as shown in FIG. 5.

Figure 12:
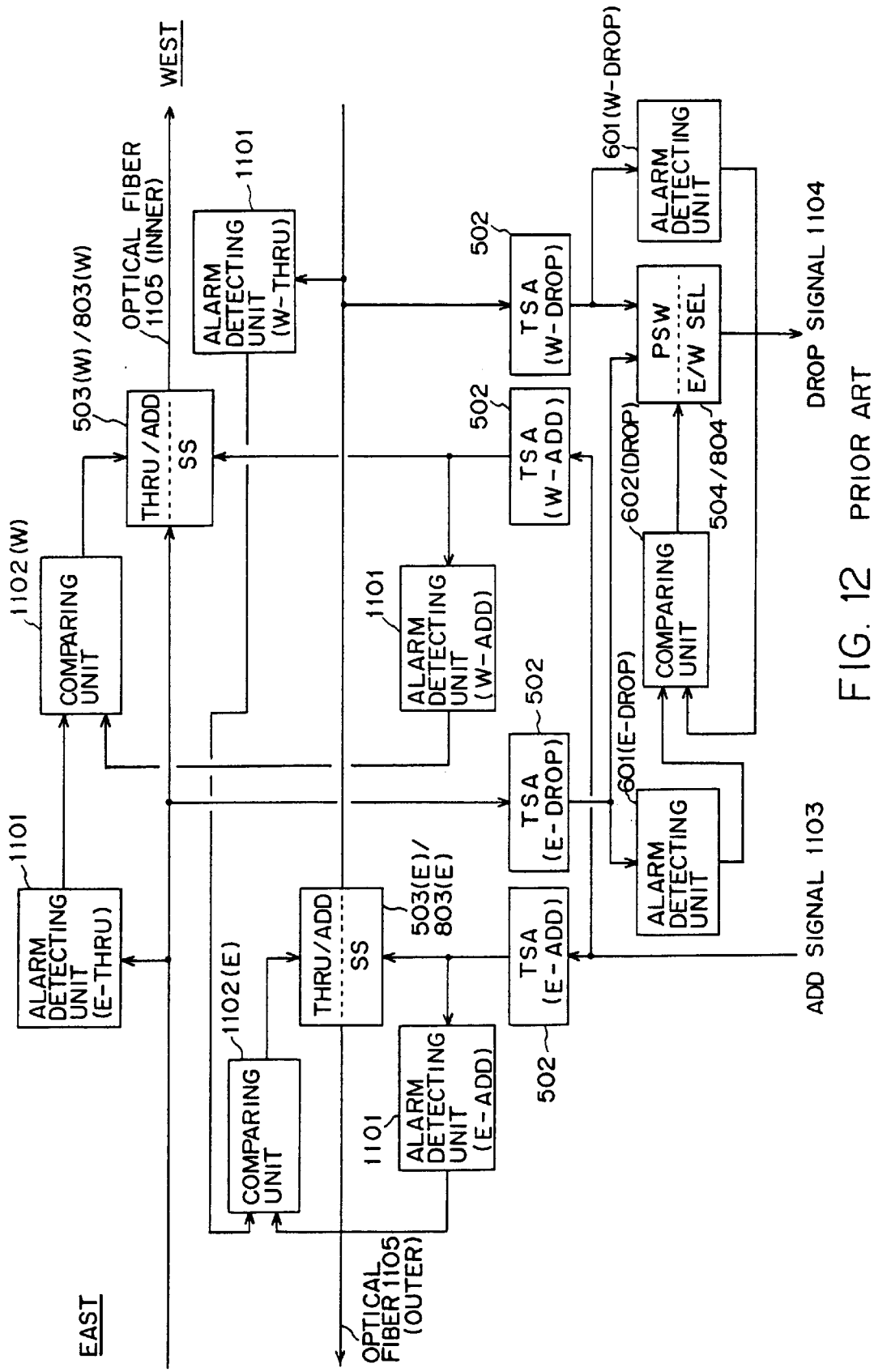
FIG. 12 shows the configuration of a conventional ADM apparatus with both the path switch ring function and bi-directional line switch ring function.

The first difference between the configuration of the first preferred embodiment and the conventional configuration shown in FIG. 12 is as shown in FIG. 14, in that two alarm detecting units 601 (E-DROP) and 601 (W-DROP) conventionally required as alarm detecting units for controlling PSW 504 for implementing a PSR function, are deleted, and instead an alarm detection result to be output by a conventional alarm detecting unit 1101 (E-THRU) for a BLSR function, is cross-connected in units of STS-1 frames by an alarm TSA apparatus 1303 (E-DROP), in the same way an alarm detection result output by an alarm detecting unit 1101 (W-THRU) is cross-connected in units of STS-1 frames by an alarm TSA apparatus 1303 (W-DROP), and these two cross-connected alarms are compared with each other by a comparing unit 602 (DROP).

The second difference between the configuration of the first preferred embodiment and the conventional configuration shown in FIG. 12 is as shown in FIG. 15, in that two alarm detecting units 1101 (E-ADD) and 1101 (W-ADD) conventionally required as alarm detecting units for controlling SS 1301 (E) and SS 1301 (W) for implementing a BLSR function, are deleted, and instead one alarm detecting unit 1307 (ADD) is provided on the input side of a main signal TSA apparatus 502 (E-ADD), an alarm detection result to be output by the alarm detecting unit 1307 (ADD) is individually cross-connected in units of STS-1 frames by alarm TSA apparatuses 1303 (E-ADD) and 1303 (W-ADD), and these two cross-connected alarms are input to comparing units 1102 (E) and 1102 (W).

When the configuration of the first preferred embodiment shown in FIGS. 13 to 15 is compared with the conventional configuration shown in FIG. 12, it is found that three alarm detecting units are deleted, and four alarm TSA apparatuses 1303 are added.

As described before, the circuitry scale of an alarm detecting unit is large. On the other hand, since the bit number of each alarm detection result signal is small compared with the bit number of a main signal, the main signal TSA apparatuses 502 (E-DROP), 502 (W-DROP), 502 (E-ADD) and 502 (W-ADD) can share the same LSI chip as the alarm TSA apparatuses 1303 (E-DROP), 1303 (W-DROP), 1303 (E-ADD) and 1303 (W-ADD). As a result, the hardware scale of the configuration of the first preferred embodiment shown in FIGS. 13 to 15 can be greatly reduced compared with that of the conventional configuration shown in FIG. 12.

The Second Preferred Embodiment

Figure 17:
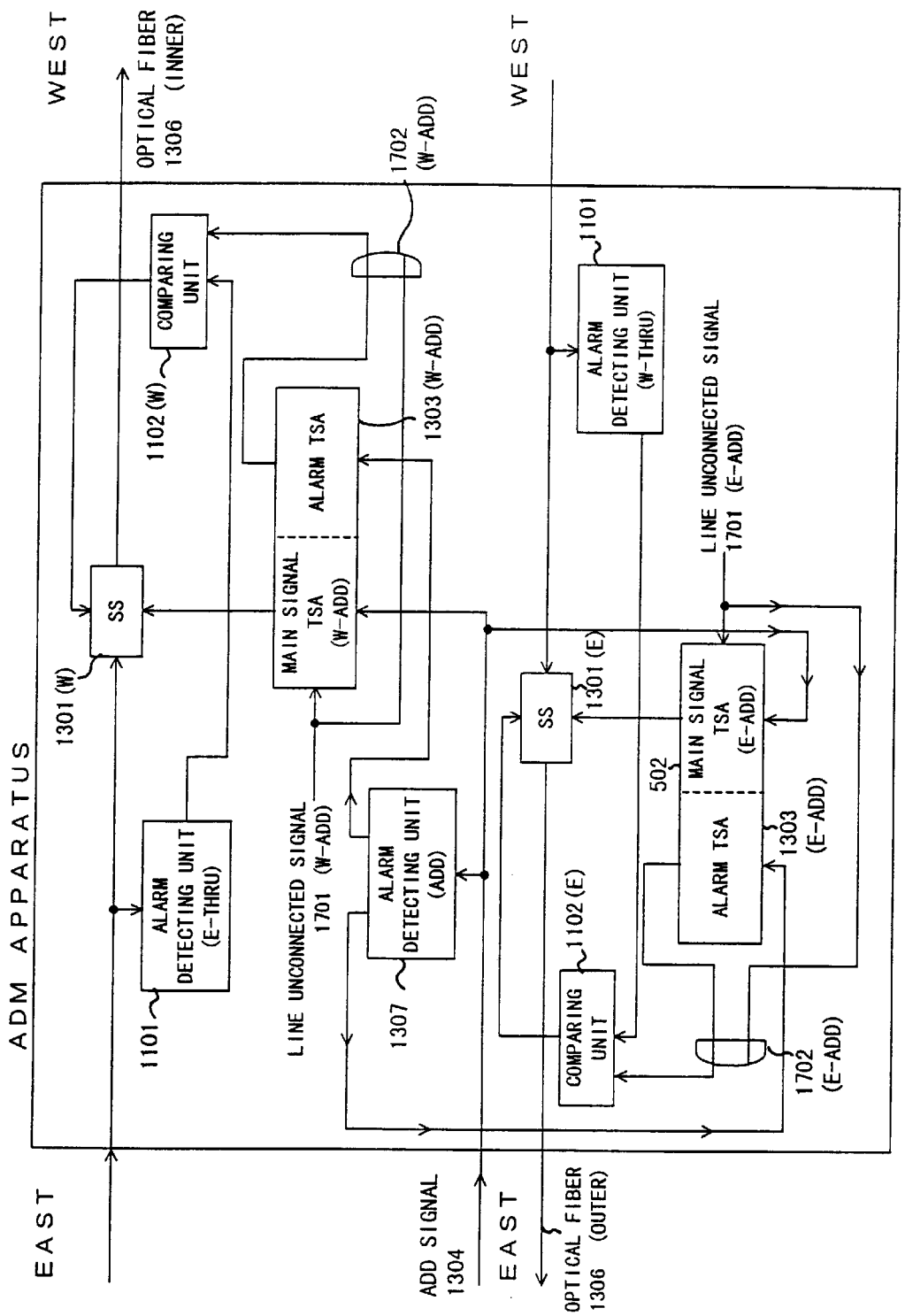
FIG. 17 shows the configuration of the bi-directional line switch ring function in the second preferred embodiment of the ADM apparatus.

Both FIGS. 16 and 17 show the portion related to a PSR function and the portion related to a BLSR function, respectively, of the second preferred embodiment of an ADM apparatus with both PSR and BLSR functions of this invention.

In the configuration of the second preferred embodiment shown in FIGS. 16 and 17, line unconnected signals 1601 (E-DROP), 1601 (W-DROP), 1701 (E-ADD) and 1701 (W-ADD), OR operation units 1602 (E-DROP), 1602 (W-DROP), 1702 (E-ADD) and 1702 (W-ADD) for executing OR operations for each alarm detection result signal output by alarm TSA apparatuses 1303 (E-DROP), 1303 (W-DROP), 1303 (E-ADD) and 1303 (W-ADD) are added for each channel (each STS-1 frame timing) to the configuration of the first preferred embodiment shown in FIGS. 14 and 15 (or FIG. 13 being the combination of both drawings).

For example, when in FIG. 16 a line unconnected signal 1601 (E-DROP) is activated for a predetermined channel, the active line unconnected signal 1601 (E-DROP) is input to a comparing unit 602 (DROP) regardless of the state of the alarm detection result signal output by an alarm TSA apparatus 1303 (E-DROP) for the channel. As a result, the comparing unit 602 (DROP) outputs a comparison result bit so as not to select the output of the main signal TSA apparatus 502 (E-DROP) for a PSW 1302.

In this way, in the second preferred embodiment, a line unconnected state can be easily set for an ADM apparatus.

The Third Preferred Embodiment

Figure 18:
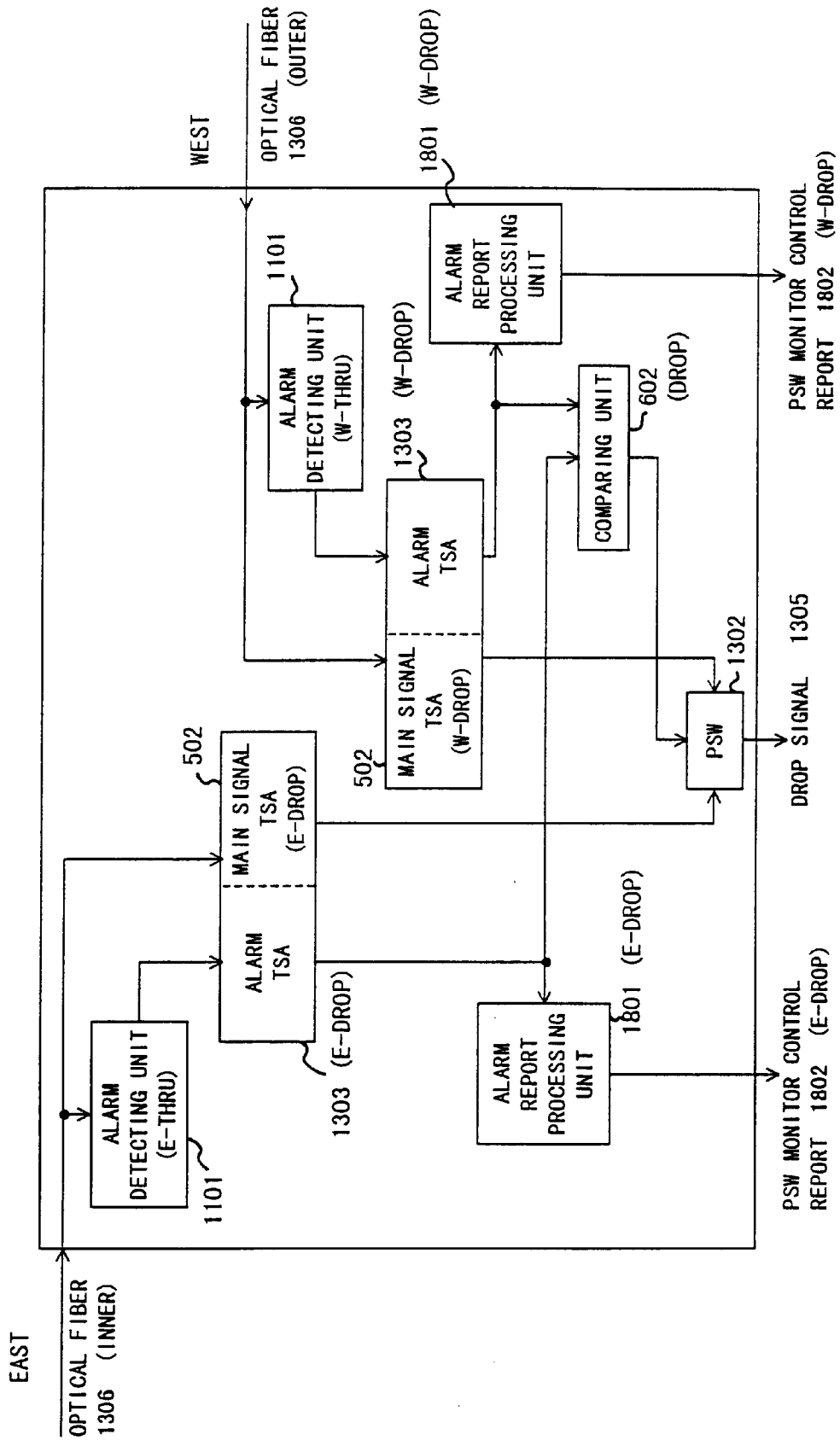
FIG. 18 shows the configuration of the path switch ring function in the third preferred embodiment of the ADM apparatus.
Figure 19:
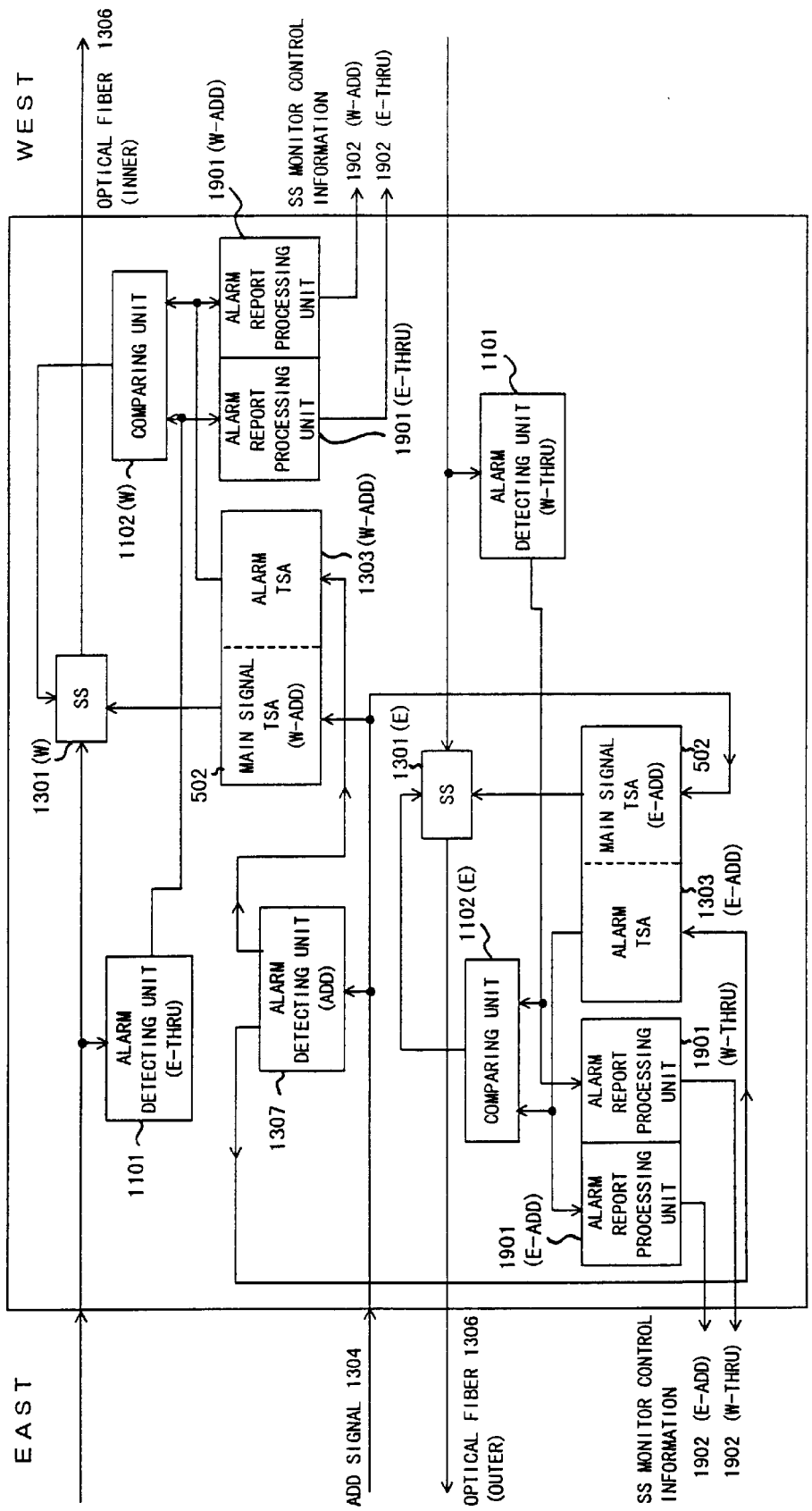
FIG. 19 shows the configuration of the bi-directional line switch ring function in the third preferred embodiment of the ADM apparatus.

Both FIGS. 18 and 19 show the portion related to a PSR function and the portion related to a BLSR function, respectively, of the third preferred embodiment of an ADM apparatus with both PSR and BLSR functions of this invention.

In the configuration of the third preferred embodiment shown in FIGS. 18 and 19, to the configuration of the first preferred embodiment shown in FIGS. 14 and 15 (or FIG. 13 being the combination of both drawings), alarm report processing units 1801 (E-DROP) and 1801 (W-DROP) for reporting the alarm detection results output by alarm TSA apparatuses 1303 (E-DROP) and 1303 (W-DROP), respectively, externally as PSW monitor control reports 1802 (E-DROP) and 1802 (W-DROP), respectively, are added, alarm report processing units 1901 (E-THRU) and 1901 (W-ADD) for reporting the alarm detection results output by an alarm detecting unit 1101 (E-THRU) and an alarm TSA apparatus 1303 (W-ADD), respectively externally as SS monitor control information 1902 (E-THRU) and 1902 (W-ADD), respectively, are added, and alarm report processing units 1901 (W-THRU) and 1901 (E-ADD) for reporting the alarm detection results output by an alarm detecting unit 1101 (W-THRU) and an alarm TSA apparatus 1303 (E-ADD), respectively, are further added.

In this way, in the third preferred embodiment, the detected state of various kinds of alarms in an ADM apparatus can be easily monitored externally.

The Fourth Preferred Embodiment

Figure 20:
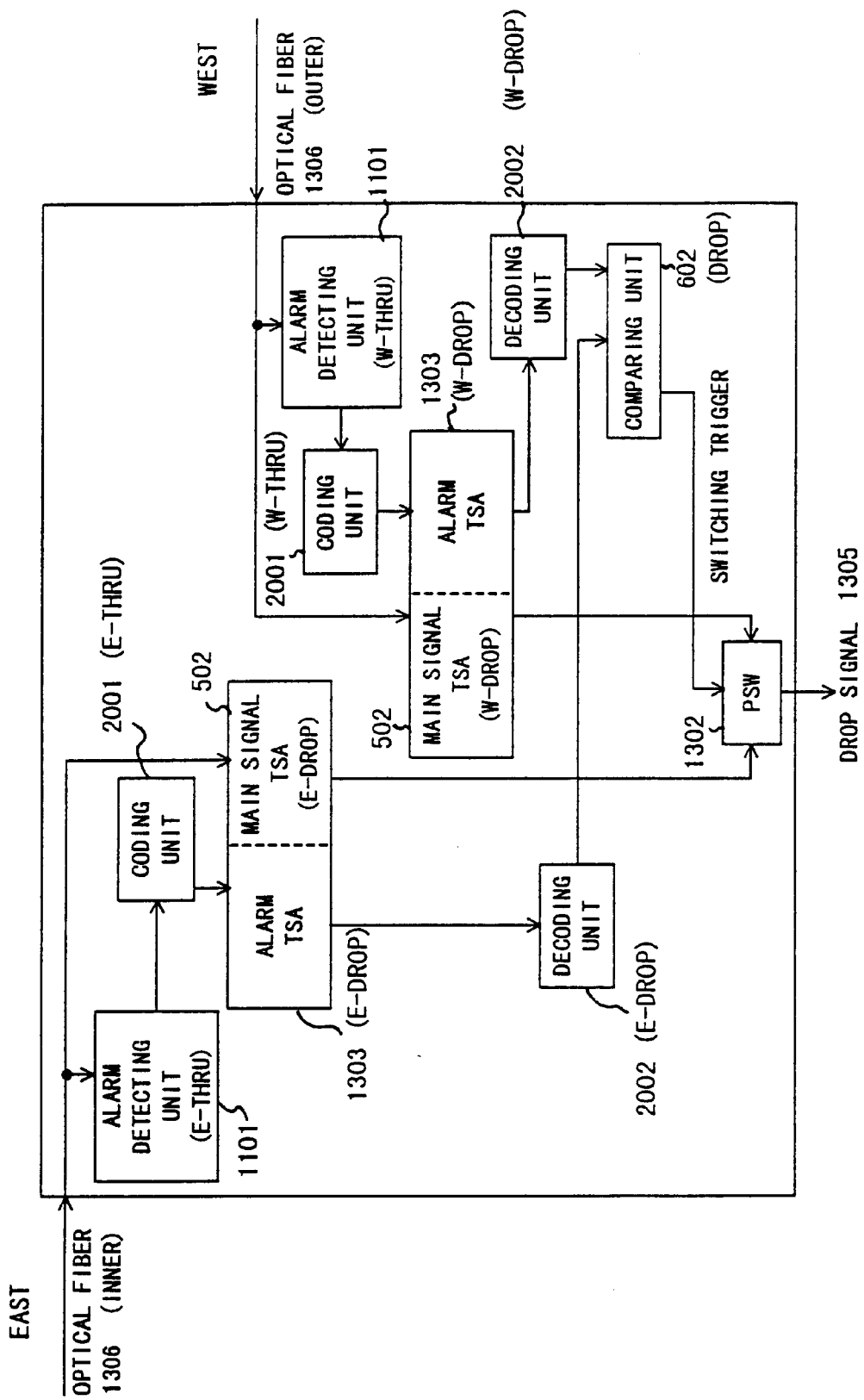
FIG. 20 shows the configuration of the path switch ring function in the fourth preferred embodiment of the ADM apparatus.
Figure 21:
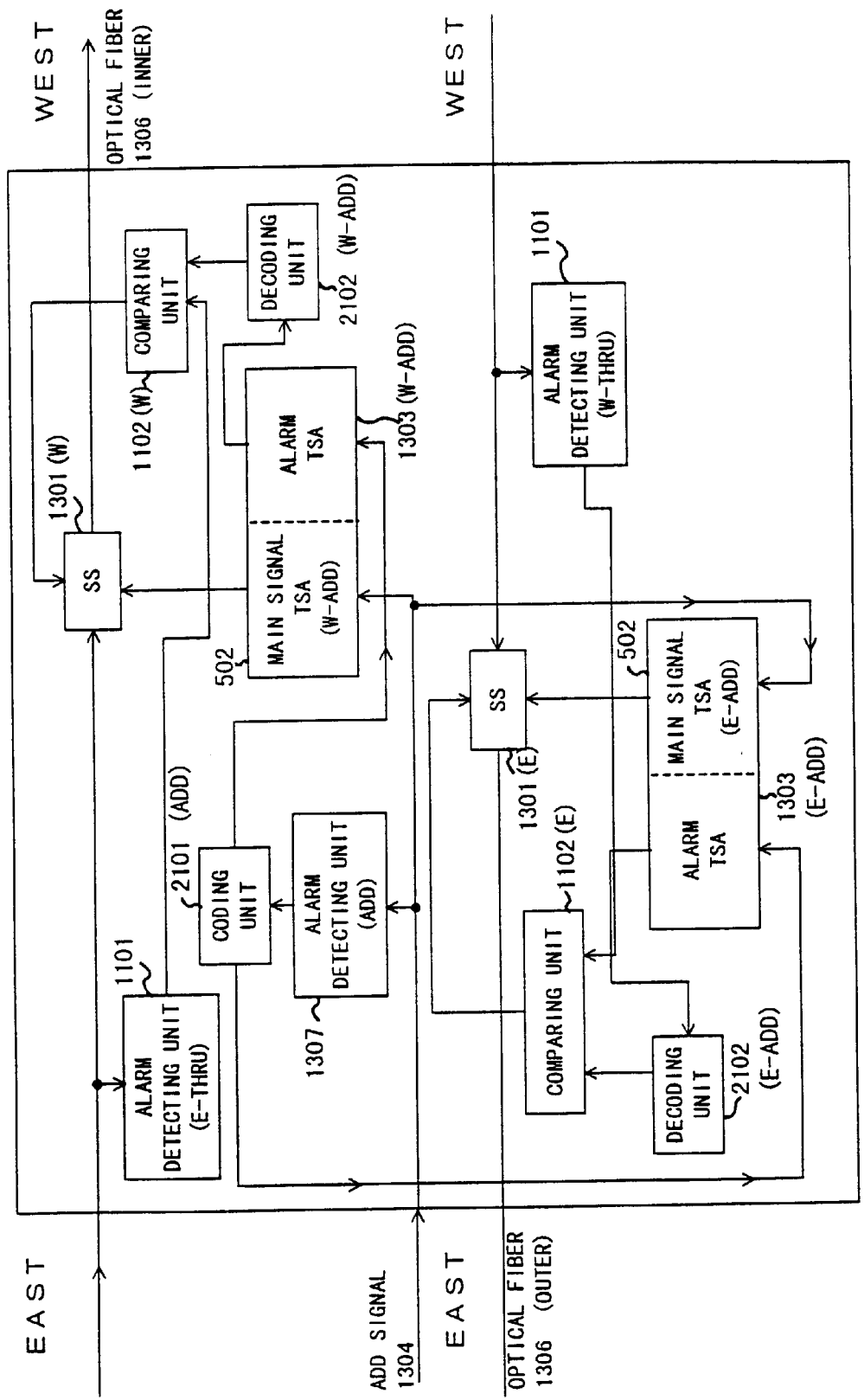
FIG. 21 shows the configuration of the bi-directional line switch ring function in the fourth preferred embodiment of the ADM apparatus.

Both FIGS. 20 and 21 show the portion related to a PSR function and the portion related to a BLSR function, respectively, of the fourth preferred embodiment of an ADM apparatus with both PSR and BLSR functions of this invention.

In the configuration of the fourth preferred embodiment shown in FIGS. 20 and 21, to the configuration of the first preferred embodiment shown in FIGS. 14 and 15 (or FIG. 13 being the combination of both drawings), coding units 2001 (E-THRU) and 2001 (W-THRU) for coding the alarm detection results output by alarm detecting units 1101 (E-THRU) and 1101 (W-THRU), respectively, and inputting the coded results to alarm TSA apparatuses 1303 (E-DROP) and 1303 (W-DROP), respectively, and decoding units 2002 (E-DROP) and 2002 (W-DROP) for decoding the coded alarm detection results output by alarm TSA apparatuses 1303 (E-DROP) and 1303 (W-DROP) and inputting the decoded results to a comparing unit 602 (DROP) are added, and coding unit 2101 (ADD) for coding the alarm detection results detected by an alarm detecting unit 1307 (ADD) and inputting the coded results to both alarm TSA apparatuses 1303 (E-ADD) and 1303 (W-ADD), and decoding units 2102 (E-ADD) and 2102 (W-ADD) for decoding the coded alarm detection results output by alarm TSA apparatuses 1303 (E-ADD) and 1303 (W-ADD), respectively, and inputting the decoded results to comparing units 1102 (E) and 1102 (W), respectively, are added.

In this way, in the fourth preferred embodiment, the bit number of each alarm detection result signal to be processed in the alarm TSA apparatuses 1303 (E-DROP), 1303 (W-DROP), 1303 (E-ADD) and 1303 (W-ADD) can be further reduced, by which the hardware scale of an ADM apparatus can be further reduced.

Figure 22:
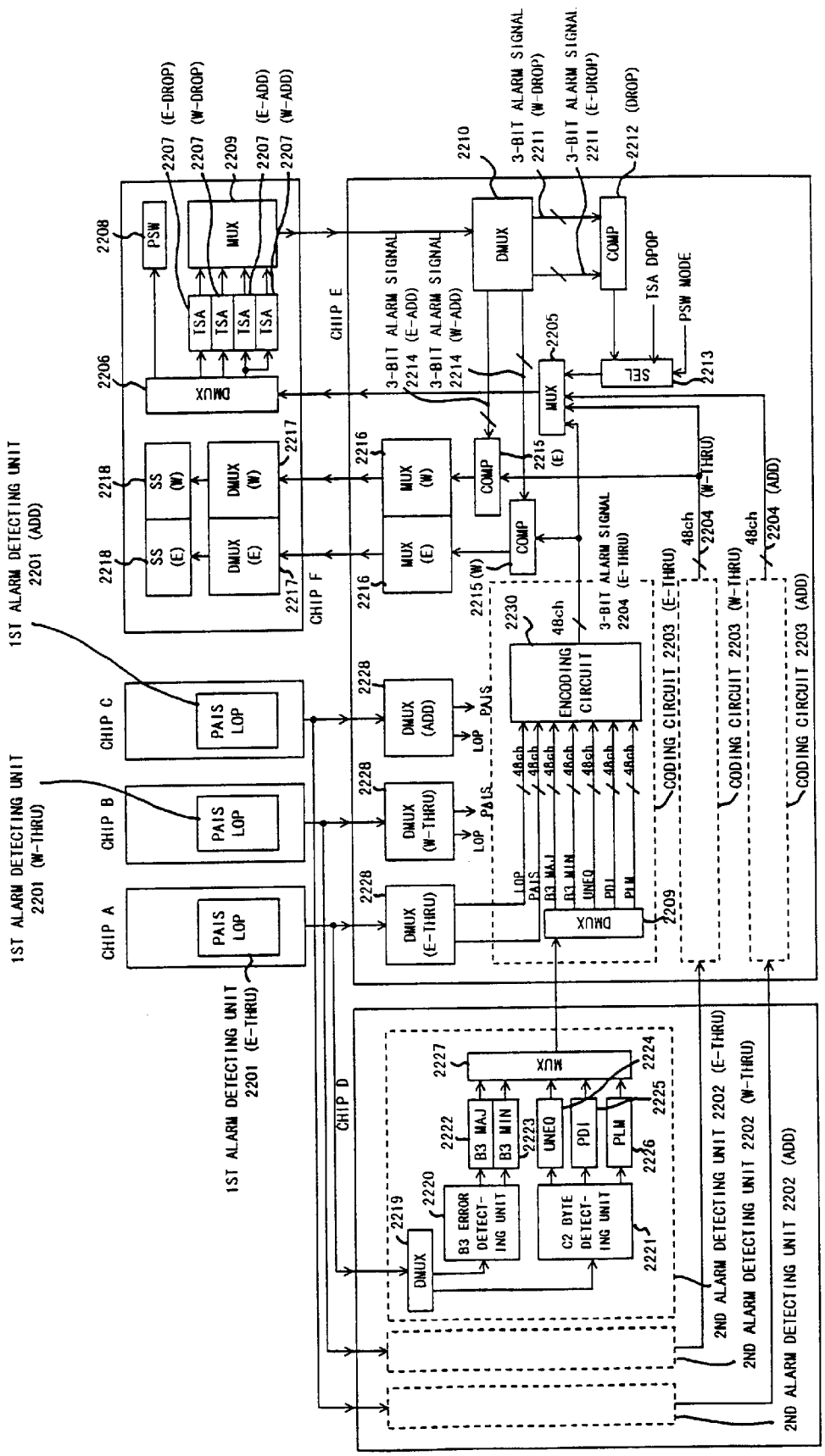
FIG. 22 shows the circuit configuration of the detailed preferred embodiment of the ADM apparatus of this invention.

FIG. 22 shows the circuit configuration of the detailed preferred embodiment of the ADM apparatus of this invention, particularly the configuration of a circuit for processing alarms.

The first alarm detecting circuit 2201 (E-THRU) in an LSI chip A and the second alarm detecting circuit 2202 (E-THRU) in an LSI chip D correspond to the alarm detecting unit 1101 (E-THRU) shown in FIG. 13. The first alarm detecting circuit 2201 (W-THRU) in an LSI chip B and the second alarm detecting circuit 2202 (W-THRU) in the LSI chip D correspond to the alarm detecting unit 1101 (W-THRU) shown in FIG. 13. The first alarm detecting circuit 2201(ADD) in an LSI chip C and the second alarm detecting circuit 2202 (ADD) correspond to the alarm detecting unit 1101 (ADD) shown in FIG. 13.

The first alarm detecting circuit 2201 (E-THRU) detects a PAIS alarm and an LOP alarm from each of the 48 channels of an STS-1 frame transmitted on the line of the input side of an inner optical fiber(INNER) (corresponding to optical fiber 1306 shown in FIG. 13). These detected alarms are multiplexed to the signal of a serial interface, and are transferred to the DMUX circuit 2228 (E-THRU) in a chip E, where the alarms are demultiplexed. The details of these alarms are described later.

In the same way, the first alarm detecting circuit 2201 (W-THRU) detects a PAIS alarm and an LOP alarm from each of the 48 channels of an STS-1 frame transmitted on the line of the input side of an outer optical fiber(OUTER) (corresponding to optical fiber 1306 shown in FIG. 13). These detected alarms are multiplexed to the signal of a serial interface, and are transferred to the DMUX circuit 2228 (W-THRU) in the chip E, where the alarms are demultiplexed.

In the same way, the first alarm detecting circuit 2201 (ADD) detects a PAIS alarm and an LOP alarm from each of the 48 channels of an STS-1 frame transmitted on an ADD signal (corresponding to ADD signal 1304 shown in FIG. 13) from a lower order group side. These detected alarms are multiplexed to the signal of a serial interface, and are transferred to the DMUX circuit 2228 (ADD) in the chip E, where the alarms are demultiplexed.

Then, the second alarm detecting circuit 2202 (E-THRU) in the LSI chip D detects the 48 channels of MAJ alarms, B3 MIN alarms, UNEQ alarms, PDI alarms and PLM alarms from the 48 channels of B3 byte data and C2 byte data detected by an LSI chip A from each of the 48 channels of an STS-1 frame transmitted on the line of the input side of the inner optical fiber (INNER) (corresponding to optical fiber 1306 shown in FIG. 13) and sent from the LSI chip A via a serial interface. The details of these alarms are described later.

To be more specific, in the second alarm detecting circuit 2202 (E-THRU) a DMUX circuit 2219 demultiplexes the 48 channels of B3 byte data and C2 byte data sent from the LSI chip A via a serial interface.

Then, a B3 error detecting circuit 2220 detects the parity indicated by each of the 48 channels of the B3 byte data.

Upon receiving this detection result both B3 MAJ alarm detecting circuit 2222 and B3 MIN alarm circuit 2223 detect the 48 channels of the B3 MAJ alarms and the 48 channels of the B3 MIN alarms, respectively.

A C2 byte detecting circuit 2221 detects each of 48 channels of the C2 byte data.

Upon receiving this judgement result, a UNEQ alarm detecting circuit 2224, a PDI alarm detecting circuit 2225 and a PLM alarm detecting circuit 2226 detect the 48 channels of UNEQ alarms, 48 channels of PDI alarms and 48 channels of PLM alarms, respectively.

48 channels of the outputs of each of the alarm detecting circuits 2222 to 2226 in the second alarm detecting circuit 2202 (E-THRU) are multiplexed to the signal of a serial interface by a MUX circuit 2227, and are transferred to the DMUX circuit 2229 of the coding circuit 2203 (E-THRU) in an LSI chip E, where the outputs are demultiplexed.

In the same way, the second alarm detecting circuit 2202 (W-THRU) in the LSI chip D detects the 48 channels of B3 MAJ alarms, B3 MIN alarms, UNEQ alarms, PDI alarms and PLM alarms from the 48 channels of the B3 byte data and C2 byte data detected from each of the 48 channels of an STS-1 frame transmitted on the line of the input side of the outer optical fiber (OUTER) (corresponding to optical fiber 1306 shown in FIG. 13) by the LSI chip A and sent from the LSI chip A via a serial interface. Then, the 48 channels of this alarm output are multiplexed to the signal of a serial interface, and are transferred to the DMUX circuit 2229 of the coding circuit 2203 (W-THRU) in the LSI chip E, where the alarm outputs are demultiplexed.

In the same way, the second alarm detecting circuit 2202 (ADD) in the LSI chip D detects the 48 channels of B3 MAJ alarms, B3 MIN alarms, UNEQ alarms, PDI alarms and PLM alarms from the 48 channels of the B3 byte data and C2 byte data detected from each of the 48 channels of an STS-1 frame transmitted on the ADD signal from a lower order group by the LSI chip A and sent from the LSI chip A via serial interface. Then, the 48 channels of this alarm output are multiplexed to the signal of a serial interface, and are transferred to the DMUX circuit 2229 of the coding circuit 2203 (ADD) in the LSI chip E, where the alarm outputs are demultiplexed.

Then, the coding circuits 2203 (E-THRU), 2203 (W-THRU) and 2203 (ADD) in the LSI chip E correspond to the coding units 2001 (E-THRU) and 2001 (W-THRU) shown in FIG. 20, and the coding circuit 2101 (ADD) shown in FIG. 21, respectively.

In the LSI chip E, the encoding circuit 2230 in a coding circuit 2203 (E-THRU) is a circuit for coding various kinds of alarms detected from each of the 48 channels of an STS-1 frame transmitted on the line of the input side of the inner optical fiber (INNER) to 48 channels of 3-bit data, it encodes the 48 channels of LOP alarms and PAIS alarms from a DMUX circuit 2228 (E-THRU), and the 48 channels of the B3 MAJ alarms, B3 MIN alarms, UNEQ alarms, PDI alarms and PLM alarms from the DMUX circuit 2229 in a coding circuit 2203 (E-THRU) to 3-bit data for each channel, and generates 48 channels of 3-bit alarm signals 2204 (E-THRU). The encoding method is described later.

In the same way, the encoding circuit 2230, not shown in the drawing, in a coding circuit 2203 (W-THRU) is a circuit for coding various kinds of alarms detected from each of the 48 channels of an STS-1 frame transmitted on the line of the input side of the outer optical fiber (OUTER), and it encodes the 48 channels of LOP alarms and PAIS alarms from a DMUX circuit 2228 (W-THRU), and the 48 channels of the B3 MAJ alarms, B3 MIN alarms, PDI alarms and PLM alarms from the DMUX circuit 2229, not shown in the drawing, in a coding circuit 2203 (W-THRU) to 3-bit data for each channel, and generates 48 channels of 3-bit alarm signals 2204 (W-THRU).

In the same way, the encoding circuit 2230, not shown in the drawing, in a coding circuit 2203 (ADD) is a circuit for coding various kinds of alarms detected from each of the 48 channels of an STS-1 frame transmitted on the ADD signal of a lower order group side, and it encodes the 48 channels of LOP alarms and PAIS alarms from a DMUX circuit 2228 (ADD), and the 48 channels of the B3 MAJ alarms, B3 MIN alarms, PDI alarms and PLM alarms from the DMUX circuit 2229, not shown in the drawing, in a coding circuit 2203 (ADD) to 3-bit data for each channel, and generates 48 channels of 3-bit alarm signals 2204 (ADD).

The 48 channels of 3-bit alarm signals 2204 (E-THRU) output from the coding circuit 2203 (E-THRU), 48 channels of 3-bit alarm signals 2204 (W-THRU) output from the coding circuit 2203 (W-THRU) and 48 channels of 3-bit alarm signals 2204 (ADD) output from the coding circuit 2203 (ADD) are multiplexed to the signals of a serial interface by a MUX circuit 2205, and are transferred to the DMUX circuit 2206 in an LSI chip F, where the 3-bit alarm signals are demultiplexed.

In the LSI chip F, a TSA apparatus 2207 (E-DROP) corresponds to both main signal TSA apparatus 502 (E-DROP) and alarm TSA apparatus 1303 (E-DROP) shown in FIG. 13, and in FIG. 22 generates 48 channels of cross-connected 3-bit alarm signals 2211 (E-DROP) by executing a cross-connection process for the 48 channels of 3-bit alarm signals 2204 (E-THRU) detected from each of the 48 channels of an STS-1 frame transmitted on the line of the input side of the inner optical fiber (INNER) and output from the DMUX circuit 2206.

In the same way, a TSA apparatus 2207 (W-DROP) corresponds to both main signal TSA apparatus 502 (W-DROP) and alarm TSA apparatus 1303 (W-DROP) shown in FIG. 13, and in FIG. 22 generates the 48 channels of cross-connected 3-bit alarm signals 2211 (W-DROP) by executing a cross-connection process for the 48 channels of 3-bit alarm signals 2204 (W-THRU) detected from each of the 48 channels of an STS-1 frame transmitted on the line of the input side of the outer optical fiber (OUTER) and output from the DMUX circuit 2206.

In the same way, a TSA apparatus 2207 (E-ADD) corresponds to both main signal TSA apparatus 502 (E-ADD) and alarm TSA apparatus 1303 (E-ADD) shown in FIG. 13, and in FIG. 22 generates 48 channels of cross-connected 3-bit alarm signals 2214 (E-ADD) by executing a cross-connection process for the 48 channels of 3-bit alarm signals 2204 (ADD) detected from each of the 48 channels of an STS-1 frame transmitted on the line of the input side of the outer optical fiber (OUTER) and output from the DMUX circuit 2206.

In the same way, a TSA apparatus 2207 (W-ADD) corresponds to both main signal TSA apparatus 502 (W-ADD) and alarm TSA apparatus 1303 (W-ADD) shown in FIG. 13, and in FIG. 22 generates 48 channels of cross-connected 3-bit alarm signals 2214 (W-ADD) by executing a cross-connection process for the 48 channels of 3-bit alarm signals 2204 (ADD) detected from each of the 48 channels of an STS-1 frame transmitted on the line of the input side of the outer optical fiber (OUTER) and output from the DMUX circuit 2206.

The 48 channels of the cross-connected 3-bit alarm signals 2211 (E-DROP) output from the TSA apparatus 2207 (E-DROP), 48 channels of the cross-connected 3-bit alarm signals 2211 (W-DROP) output from the TSA apparatus 2207 (W-DROP), 48 channels of the cross-connected 3-bit alarm signals 2214 (E-ADD) output from the TSA apparatus 2207 (E-ADD) and the 48 channels of the cross-connected 3-bit alarm signals 2214 (W-ADD) output from the TSA apparatus 2207 (W-ADD) are multiplexed to the signal of a serial interface by a MUX circuit 2209, and are transferred to the DMUX circuit 2210 in the LSI chip E, where the 3-bit alarm signals are demultiplexed.

The 48 channels of 3-bit alarm signals 2211 (E-DROP) and 2211 (W-DROP) demultiplexed in the DMUX circuit 2210 are compared with each other in a comparing circuit (COMP) 2212 (DROP) for each channel, and the 48 channels of the comparison result bits obtained as a result are input to a selector 2213. This comparing circuit (COMP) 2212 (DROP) corresponds to the comparing unit 602 (DROP) shown in FIG. 13.

If a PSW MODE signal to be input to the selector 2213 designates a PSR function, the 48 channels of the comparison result bits output by the comparing circuit 2212 (DROP) are multiplexed to the signal of a serial interface by a MUX circuit 2205, are transferred to the DMUX circuit 2206 in the LSI chip F, are multiplexed there, and are input to a PSW 2208. The PSW 2208 in the LSI chip F corresponds to the PSW 2208 shown in FIG. 13, selects either the main signal output from the TSA apparatus 2207 (E-DROP) or the main signal output from the TSA apparatus 2207 (W-DROP) for each channel (for each STS-1 frame timing), based on the 48 channels of the above-mentioned comparison result bits, and outputs the signal as a DROP signal (corresponding to DROP signal 1305 shown in FIG. 13).

On the other hand, if a PSW MODE signal to be input to the selector 2213 in the LSI chip E does not designate a PSR function, that is, it designates a BLSR function, the 48 channels of the comparison result bits output by the comparing circuit 2212 (DROP) are not transferred to the MUX circuit 2205, but a TSA DROP signal for collectively making the PSW 2208 select either all the channels of the main signals output from the TSA apparatus 2207 (E-DROP) or all the channels of the main signals output from the TSA apparatus 2207 (W-DROP), is transferred to the MUX circuit 2205. This signal is transferred from the MUX circuit 2205 to the PSW 2208 via the DMUX circuit 2206 in the LSI chip F. In this case, the PSW 2208 operates as an E/W SEL for the BLSR function, collectively selects either all channels of the main signals output from the TSA apparatus 2207 (E-DROP) or all channels of the main signals output from the TSA apparatus 2207 (W-DROP) based on the above-mentioned TSA DROP signal, and outputs the main signals as DROP signals (corresponding to DROP signal 1305 shown in FIG. 13).

In the LSI chip E, a comparing circuit (COMP) 2215 (E) corresponds to the comparing unit 1102 (E) shown in FIG. 13, and compares the 48 channels of 3-bit alarm signals 2204 (W-THRU) output from the coding circuit 2203 (W-THRU) with the 48 channels of cross-connected 3-bit alarm signals 2214 (E-ADD) output from the DMUX circuit 2210 for each channel.

The 48 channels of the comparison result bits obtained as a result are multiplexed to the signal of a serial interface in a MUX circuit 2216 (E), are transferred to the DMUX circuit 2217 (E) in the LSI chip F, are demultiplexed there, and are input to a selector SS 2218 (E).

In the LSI chip F, the SS 2218(E) corresponds to the SS 1301 (E) shown in FIG. 13, selects either the main signal output from the TSA apparatus 2207 (E-ADD) or the main signal input from the outer optical fiber (OUTER) not shown in the drawing (corresponding to optical fiber 1306 shown in FIG. 13) for each channel (for each STS-1 frame timing) based on the 48 channels of the above-mentioned comparison result bits, and outputs the main signal to the outer optical fiber (OUTER).

In the same way, a comparing circuit (COMP) 2215 (W) corresponds to the comparing unit 1102 (W) shown in FIG. 13, and compares the 48 channels of 3-bit alarm signals 2204 (E-THRU) output from the coding circuit 2203 (E-THRU) with the 48 channels of cross-connected 3-bit alarm signals 2214 (E-ADD) output from the DMUX circuit 2210 for each channel.

The 48 channels of the comparison result bits obtained as a result are multiplexed to the signal of a serial interface in a MUX circuit 2216 (W), are transferred to the DMUX circuit 2217 (W) in the LSI chip F, are demultiplexed there, and are input to a selector SS 2218 (W).

In the LSI chip F, the SS 2218(W) corresponds to the SS 1301 (W) shown in FIG. 13, selects either the main signal output from the TSA apparatus 2207 (W-ADD) or the main signal input from the inner optical fiber (INNER) not shown in the drawing (corresponding to optical fiber 1306 shown in FIG. 13) for each channel (for each STS-1 frame timing) based on the 48 channels of the above-mentioned comparison result bits, and outputs the main signal to the inner optical fiber (INNER).

FIG. 23 shows the contents of alarms, and the flag contents of 3-bit alarm signals 2204, 2211 and 2214.

An LOP (loss of pointer) alarm occurs when in an STS-1 frame it is detected that a pointer indicating the head is lost. Both A1 and A2 bytes shown in FIG. 3 of the section overhead shown in FIG. 2 of an STS-1 frame indicate the framing pattern of the STS-1 frame, and when the first alarm detecting circuit 2201 shown in FIG. 22 cannot detect this pattern, the above-mentioned LOP alarm occurs.

Figure 1:
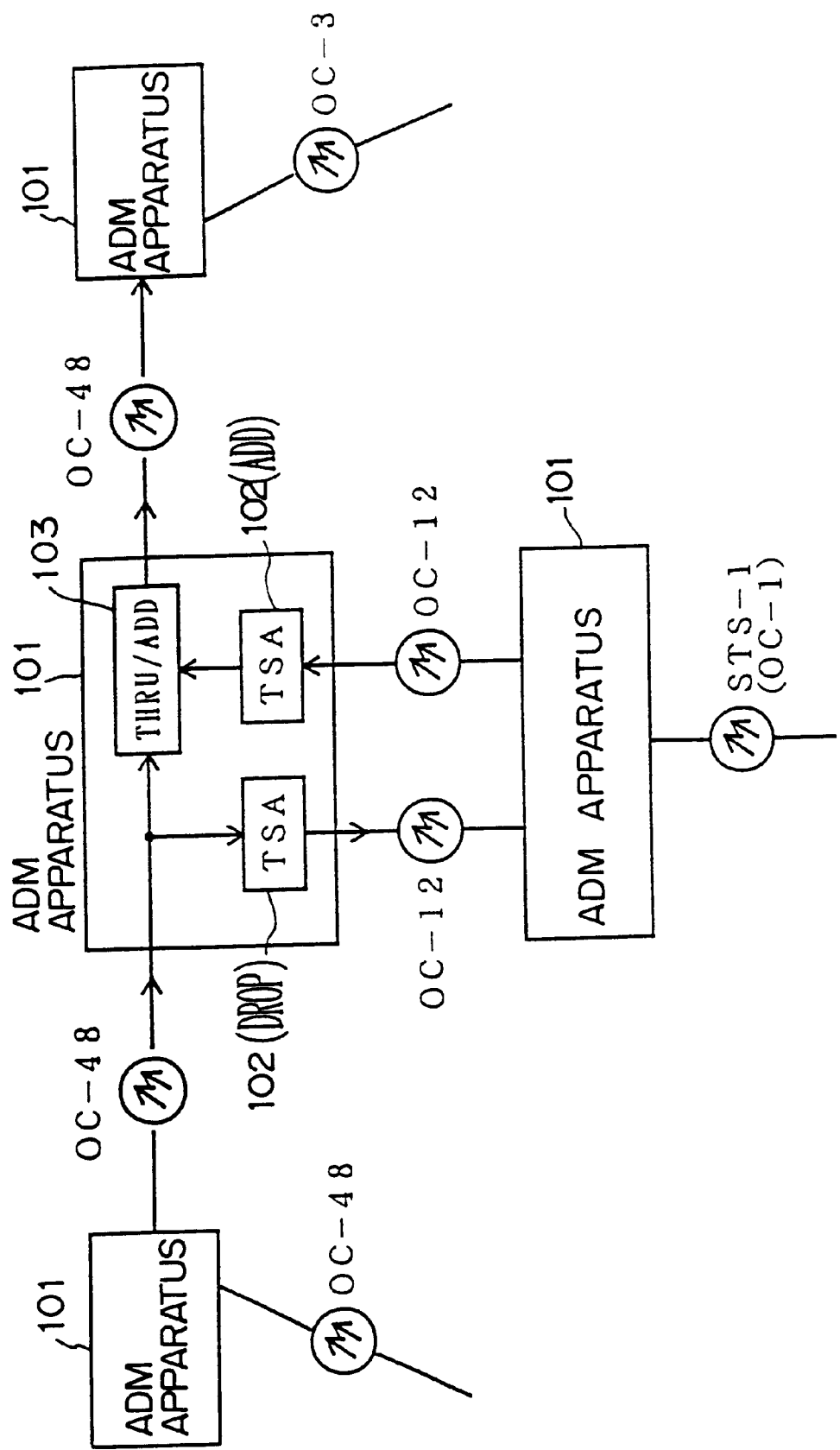
FIG. 1 explains an ADM apparatus.
Figure 2:
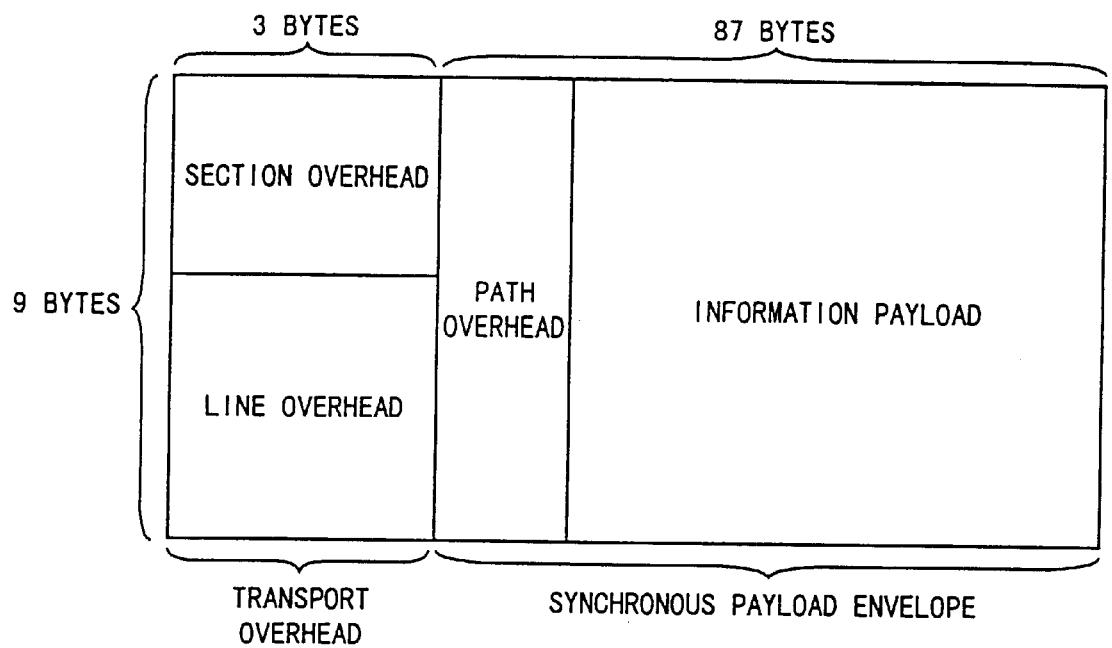
FIG. 2 is a chart showing the frame format of an STS-1 signal in a SONET interface.
Figure 3:
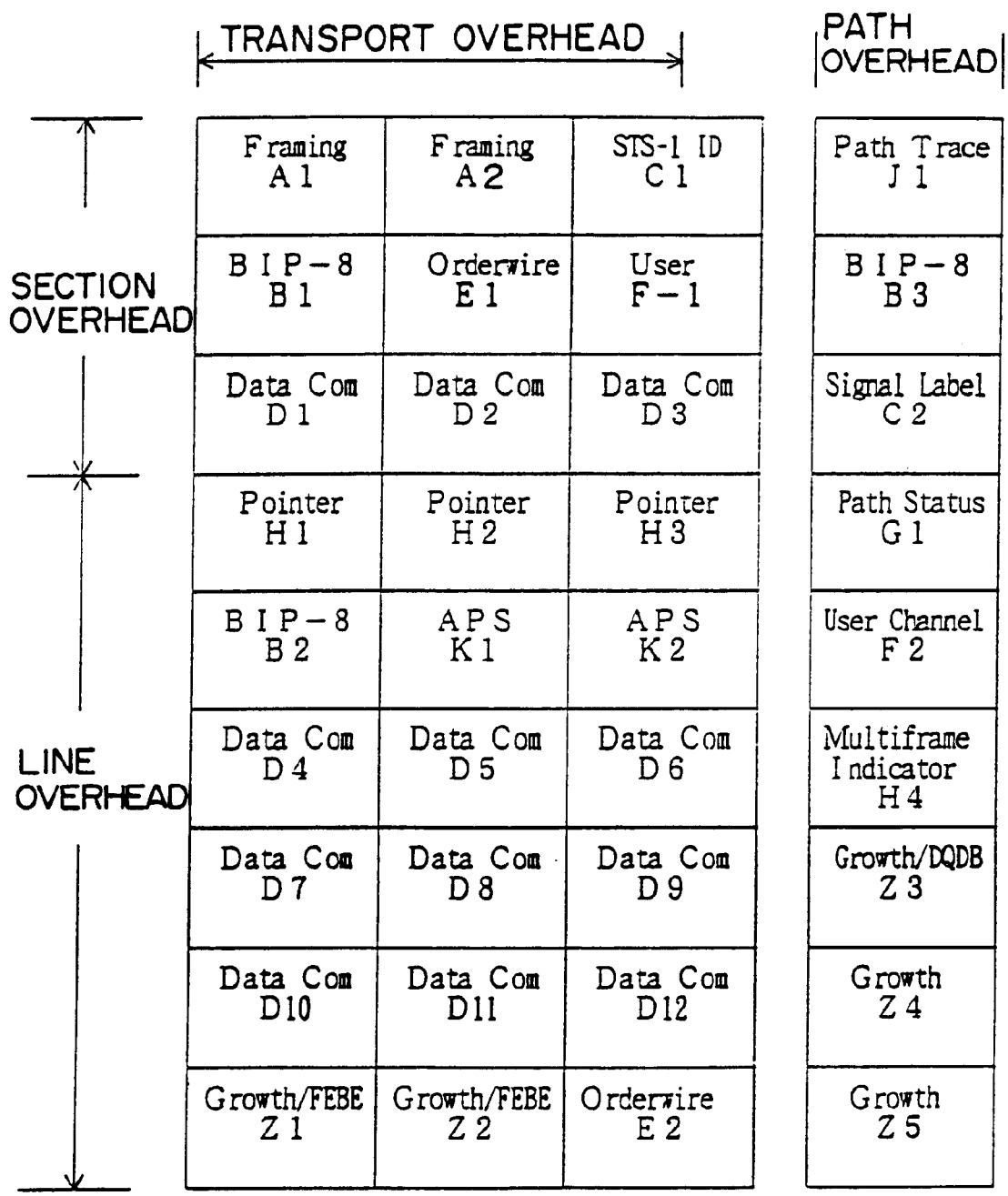
FIG. 3 shows the structure of a SONET STS-1 overhead.
Figure 4:
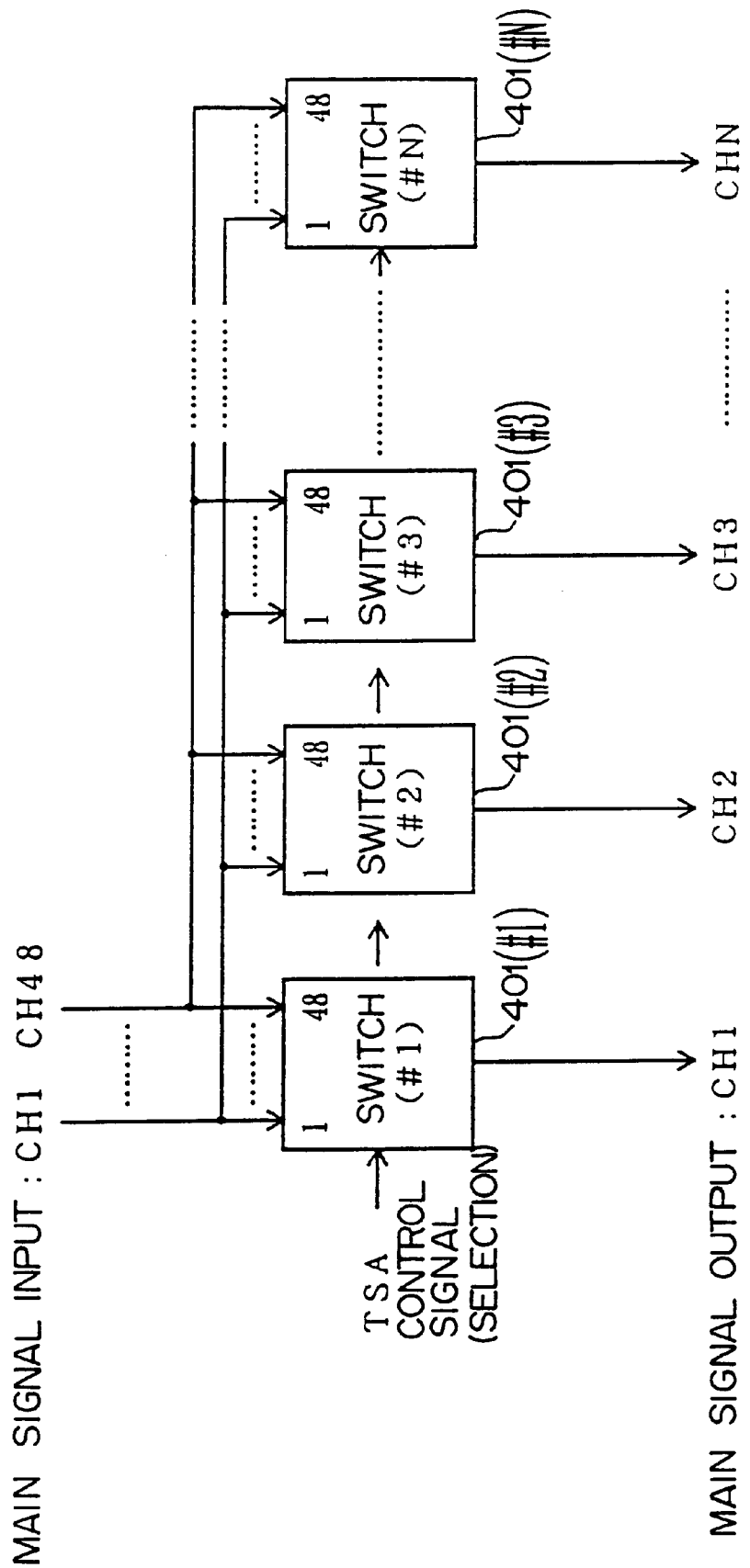
FIG. 4 shows the basic configuration of a TSA apparatus.

A PAIS (path alarm indication signal) occurs when the first alarm detecting circuit 2201 shown in FIG. 22 detects that all the bits of both H1 and H2 bytes shown in FIG. 3 of the line overhead shown in FIG. 2 of the STS-1 frame become "1".

A UNEQ (unequipped code) alarm occurs when a UNEQ alarm detecting circuit 2224 in the second alarm detecting circuit 2202 shown in FIG. 22 detects that all the bits of C2 byte shown in FIG. 3 of the path overhead shown in FIG. 2 of the STS-1 frame detected by the C2 byte detecting circuit 2221 in the second alarm detecting circuit 2202 become "0". This UNEQ alarm indicates that the information payload in the STS-1 frame (see FIG. 2) has entered an unused or blank state.

A PDI (payload detect indication) alarm occurs when a PDI alarm circuit 2225 in the second alarm detecting circuit 2202 shown in FIG. 22 detects that a C2 byte detected by the C2 byte detecting circuit 2221 in the second alarm detecting circuit 2202 becomes a value indicating that there is a failure in an information payload.

A PLM (payload label mismatch) alarm occurs when a PLM alarm detecting circuit 2226 in the second alarm detecting circuit 2202 shown in FIG. 22 detects that a value indicated by a C2 byte detected by a C2 byte detecting circuit 2221 in the second alarm detecting circuit 2202 becomes a value different from the value expected by an ADM apparatus.

A B3 MAJ alarm occurs when a B3 MAJ alarm detecting circuit 2222 in the second alarm detecting 2202 shown in FIG. 22 detects a parity error of $10^{-3}$ order based on the B3 byte shown in FIG. 3 of the path overhead shown in FIG. 2 of the STS-1 frame detected by a B3 error detecting circuit 2220 in the second alarm detecting circuit 2202.

A B3 MIN alarm occurs when a B3 MIN alarm detecting circuit 2223 in the second alarm detecting circuit 2202 shown in FIG. 22 detects a parity error of $10^{-6}$ order based on the B3 byte shown in FIG. 3 of the path overhead shown in FIG. 2 of the STS-1 frame detected by a B3 error detecting circuit 2220 in the second alarm detecting circuit 2202.

By encoding the total eight states of seven kinds of the above-mentioned alarms and one kind of state indicating a normal state to 3 bits as shown in FIG. 23, the load of a cross-connection process in the TSA apparatus 2207 shown in FIG. 22 can be reduced.

Each of the comparing circuits (COMP) 2212 (DROP), 2215 (E) and 2215 (W) shown in FIG. 22 has a function for decoding the above-mentioned encoded 3-bit alarm signal, corresponding to the decoding units 2002 (E-DROP) and 2002 (W-DROP) shown in FIG. 20, and 2102 (W-ADD) shown in FIG. 21.

What is claimed is:

1. A path switching device for a transmission apparatus comprising a first main signal frame switching unit executing a first frame switching process for each of all or a part of frames in a first transmission signal on a first line to which one or more frames including an area for displaying alarms are multiplexed, a second main signal frame switching unit executing a second frame switching process for each of all or a part of frames in a second transmission signal on a second line to which one or more frames including an area for displaying alarms are multiplexed, and a switching unit selecting an output of either said first main signal frame switching unit or said second main signal frame switching unit in units of said frames and outputting the selected output as a third transmission signal to a third line, a third main signal frame switching unit executing a third frame switching process for each of all or a part of frames in a fourth transmission signal on a fourth line to which one or more frames including an area for displaying alarms are multiplexed, a fourth main signal frame switching unit executing a fourth frame switching process for each of all or a part of frames in the fourth transmission signal on the fourth line, a first service selector unit selecting either an output of said third main signal frame switching unit or an input of the first line in units of said frames and outputting the selected signal to said first line, and a second service selector unit selecting either an output of said fourth main signal frame switching unit or an input of the second line in units of said frames and outputting the selected signal to said second line, further comprising:

a first alarm detecting unit detecting each alarm corresponding to each frame contained in the first transmission signal, from the input side of said first transmission signal;

a second alarm detecting unit detecting each alarm corresponding to each frame contained in the second transmission signal, from the input side of said second transmission signal;

a first alarm switching unit executing a switching process in the same frame order as said first frame switching process, for an alarm of each of said frames output by said first alarm detecting unit;

a first comparing unit making said switching unit select an output of either said first main signal frame switching unit or said second main signal frame switching unit in units of said frames by comparing alarms of each of said frames output by the first and second alarm switching units with each other;

a third alarm detecting unit detecting each alarm corresponding to each frame contained in the fourth transmission signal, from said fourth transmission signal;

a third alarm switching unit executing a switching process in the same frame order as said third frame switching process, for an alarm of each of said frames output by the third alarm detecting unit;

a fourth alarm switching unit executing a switching process in the same frame order as said fourth frame switching process, for an alarm of each of said frames output by the third alarm detecting unit;

a second comparing unit controlling said first service selector unit by comparing an alarm for each of said frames output by the third alarm switching unit with an alarm for each of said frames detected by said first detecting unit; and a third comparing unit controlling said second service selector unit by comparing an alarm for each of said frames output by the fourth alarm switching unit with an alarm for each of said frames detected by said second alarm detecting unit.

2. The path switching device according to claim 1, which further comprises:

a first alarm reporting unit reporting as alarm monitor information an alarm for each of said frames output by said first alarm switching unit;

a second alarm reporting unit reporting as alarm monitor information an alarm for each of said frames output by said second alarm switching unit;

a third alarm reporting unit reporting as alarm monitor information an alarm for each of said frames output by said third alarm switching unit;

a fourth alarm reporting unit reporting as alarm monitor information an alarm for each of said frames output by said fourth alarm switching unit;

a fifth alarm reporting unit reporting as alarm monitor information an alarm for each of said frames output by said first alarm detecting unit; and a sixth alarm reporting unit reporting as alarm monitor information an alarm for each of said frames output by said second alarm detecting unit.

3. The path switching device according to claim 1, which further comprises:

a first coding unit coding an alarm input to said first alarm switching unit;

a second coding unit coding an alarm input to said second alarm switching unit;

a third coding unit coding each alarm input to said third and fourth alarm switching unit;

a first decoding unit decoding a coded alarm output from said first alarm switching unit;

a second decoding unit decoding a coded alarm output from said second alarm switching unit;

a third decoding unit decoding a coded alarm output from said third alarm switching unit;

a fourth decoding unit decoding a coded alarm output from said fourth alarm switching unit.

4. The path switching device according to claim 1, which further comprises:

a first OR operating unit executing an OR operation using both an alarm for each of said frames output by said first alarm switching unit and a first line unconnected signal for indicating for each of said frames that the first line is set unconnected, and inputting the operation result to said first comparing unit;

a second OR operating unit executing an OR operation using both an alarm for each of said frames output by said second alarm switching unit and a second line unconnected signal for indicating for each of said frames that the second line is set unconnected, and inputting the operation result to said first comparing unit;

a third OR operating unit executing an OR operation using both an alarm for each of said frames output by said third alarm switching unit and a third line unconnected signal for indicating for each of said frames that the fourth line is set unconnected, and inputting the operation result to said second comparing unit; and a fourth OR operating unit executing an OR operation using both an alarm for each of said frames output by said fourth alarm switching unit and a fourth line unconnected signal for indicating for each of said frames that the fourth line is set unconnected, and inputting the operation result to said third comparing unit.

5. A path switching device for a transmission apparatus comprising a first main signal frame switching means for executing a first frame switching process for each of all or a part of frames in a first transmission signal on a first line to which one or more frames including an area for displaying alarms are multiplexed, a second main signal frame switching means for executing a second frame switching process for each of all or a part of frames in a second transmission signal on a second line to which one or more frames including an area for displaying alarms are multiplexed, and a switching means for selecting an output of either said first or said second main signal frame switching unit in units of said frames and outputting the selected output as a third transmission signal to a third line, a third main signal frame switching means for executing a third frame switching process for each of all or a part of frames in a fourth transmission signal on a fourth line to which one or more frames including an area for displaying alarms are multiplexed, a fourth main signal frame switching means for executing a fourth frame switching process for each of all or a part of frames in the fourth transmission signal on the fourth line, a first service selector means for selecting either an output of said third main signal frame switching means or an input of the first line in units of said frames and outputting the selected signal to said first line, and a second service selector means for selecting either an output of said fourth main signal frame switching means or an input of the second line in units of said frames and outputting the selected signal to said second line, further comprising:

a first alarm detecting means for detecting each alarm corresponding to each frame contained in the first transmission signal, from the input side of said first transmission signal;

a second alarm detecting means for detecting each alarm corresponding to each frame contained in the second transmission signal, from the input side of said second transmission signal;

a first alarm switching means for executing a switching process in the same frame order as said first frame switching process, for an alarm of each of said frames output by said first alarm detecting means;

a second alarm switching means for executing a switching process in the same frame order as said second frame switching process, for an alarm of each of said frames output by said second alarm detecting means;

a first comparing means for making said switching unit select an output of either said first main signal frame switching means or said second main signal frame switching means in units of said frames by comparing alarms of each of said frames output by the first and second alarm switching means with each other;

a third alarm detecting means for detecting each alarm corresponding to each frame contained in the fourth transmission signal, from said fourth transmission signal;

a third alarm switching means for executing a switching process in the same frame order as said third frame switching process for an alarm of each of said frames output by the third alarm detecting means;

a fourth alarm switching means for executing a switching process in the same frame order as said fourth frame switching process, for an alarm of each of said frames output by the third alarm detecting means;

a second comparing means for controlling said first service selector means by comparing an alarm for each of said frames output by the third alarm switching means with an alarm for each of said frames detected by said first alarm detecting means; and a third comparing means for controlling said second service selector means by comparing an alarm for each of said frames output by the fourth alarm switching means with an alarm for each of said frames detected by said second alarm detecting means.

* * * * *